US012778001B2

(12) United States Patent
Casper et al.

(10) Patent No.: US 12,778,001 B2
(45) Date of Patent: Nov. 3, 2026

(54) CAMERA DRIVEN SECTION CONTROL DELAY

(71) Applicant: Deere & Company, Moline, IL (US)

(72) Inventors: Robert T. Casper, Davenport, IA (US); Grant J. Wonderlich, Milan, IL (US); Cary S. Hubner, Geneseo, IL (US)

(73) Assignee: Deere & Company, Moline, IL (US)

( * ) Notice: Subject to any disclaimer, the term of this patent is extended or adjusted under 35 U.S.C. 154(b) by 196 days.

(21) Appl. No.: 18/416,551

(22) Filed: Jan. 18, 2024

(65) Prior Publication Data

US 2025/0040475 A1 Feb. 6, 2025

Related U.S. Application Data

(63) Continuation-in-part of application No. 18/535,673, filed on Dec. 11, 2023, now Pat. No. 12,628,729.
(Continued)

(51) Int. Cl.
*A01C 21/00* (2006.01)
*A01B 79/00* (2006.01)
(Continued)

(52) U.S. Cl.
CPC .......... *A01C 21/005* (2013.01); *A01B 79/005* (2013.01); *A01C 7/06* (2013.01); *A01C 7/105* (2013.01)

(58) Field of Classification Search
None
See application file for complete search history.

(56) References Cited

U.S. PATENT DOCUMENTS

| | | | |
|---|---|---|---|
| 9,232,687 | B2 | 1/2016 | Bassett |
| 11,445,658 | B2 | 9/2022 | Garner et al. |

(Continued)

FOREIGN PATENT DOCUMENTS

| | | | |
|---|---|---|---|
| EP | 2420122 | A1 | 2/2012 |
| EP | 3840561 | B1 | 6/2023 |

(Continued)

OTHER PUBLICATIONS

Extended European Search Report and Written Opinion issued in European Patent Application No. 24187948.5 dated Dec. 10, 2024, in 10 pages.

(Continued)

*Primary Examiner* — Peter D Nolan
*Assistant Examiner* — Jacob Kent Besteman-Street
(74) *Attorney, Agent, or Firm* — Taft Stettinius & Hollister LLP; Stephen F. Rost

(57) ABSTRACT

A patterned light from a visualization system mounted on a planter row unit is emitted onto a ground surface. A commodity and/or a product is deposited in the ground surface. Images of the projected patterned light on the trench with the commodity and/or product are captured with the visualization system. A controller determines whether the commodity captured in the image is a boundary commodity relative to a boundary. An error placement of the boundary commodity in the image relative to a boundary is determined using geographical identification metadata. If the error placement is unacceptable, a mechanical delay offset factor of a planter section control coupled with the planter row unit is adjusted. The controller determines a product characterization of the product and an error characterization of the product characterization relative to the location of the commodity. If the error characterization is unacceptable then the mechanical delay offset factor is adjusted.

19 Claims, 18 Drawing Sheets

Related U.S. Application Data

(60) Provisional application No. 63/529,853, filed on Jul. 31, 2023, provisional application No. 63/476,298, filed on Dec. 20, 2022.

(51) Int. Cl.
*A01C 7/06* (2006.01)
*A01C 7/10* (2006.01)

(56) References Cited

U.S. PATENT DOCUMENTS

| | | | | |
|---|---|---|---|---|
| 11,622,493 | B2 | 4/2023 | Arnett et al. | |
| 2013/0269578 | A1 | 10/2013 | Grimm et al. | |
| 2019/0232313 | A1 | 8/2019 | Grimm et al. | |
| 2019/0373801 | A1 | 12/2019 | Schoeny et al. | |
| 2020/0253107 | A1* | 8/2020 | Madison | A01C 7/18 |
| 2021/0307236 | A1* | 10/2021 | Strnad | A01C 7/006 |
| 2022/0071192 | A1 | 3/2022 | Benoit-Levy et al. | |
| 2022/0279704 | A1 | 9/2022 | Sharda et al. | |
| 2023/0140374 | A1* | 5/2023 | Conboy | A01C 5/062 111/149 |
| 2023/0189691 | A1 | 6/2023 | Strnad et al. | |

FOREIGN PATENT DOCUMENTS

| | | | |
|---|---|---|---|
| EP | 4198887 | A1 | 6/2023 |
| WO | WO 2021021594 | A1 | 2/2021 |

OTHER PUBLICATIONS

Extended European Search Report and Written Opinion issued in European Patent Application No. 23217218.9 dated Apr. 30, 2024, in 9 pages.

* cited by examiner

CAMERA DRIVEN SECTION CONTROL DELAY

CROSS-REFERENCE TO RELATED APPLICATIONS

The present application is a continuation-in-part of U.S. Nonprovisional application Ser. No. 18/535,673 filed on Dec. 11, 2023, which claims the benefit of U.S. Provisional Patent Application No. 63/476,298 filed on Dec. 20, 2022, the present application also claims the benefit of U.S. Provisional Patent Application No. 63/529,853 filed on Jul. 31, 2023, which are incorporated herein by reference in their entireties.

FIELD OF THE DISCLOSURE

The present disclosure relates to a visualization system for a work machine, and in particular, adjustment of a mechanical delay offset factor for improved planter section control using image processing by the visualization system for a planter row unit. The present disclosure also relates to adjustment of one or more systems on the work machine to control application of a fertilizer or herbicide product to a field based characterization of the fertilizer or herbicide product relative to a commodity or a weed in the field using image processing by the visualization system for the planter row unit.

BACKGROUND OF THE DISCLOSURE

There is a wide variety of different types of agricultural machines that apply material to an agricultural field. Some such agricultural machines include sprayers, tillage machines with side dressing bars, air seeders, and planters that have row units.

As one example, a row unit is often mounted to a planter with a plurality other row units. The planter is often towed by a tractor over soil where seed is planted in the soil, using the row units. The row units on the planter follow the ground profile by using a combination of a down force assembly that imparts a down force to the row unit to push disk openers into the ground and gauge wheels to set depth of penetration of the disk openers.

Row units can also be used to apply material to the field (e.g., fertilizer to the soil, to a seed, etc.) over which they are traveling. In some scenarios, each row unit has a valve that is coupled between a source of material to be applied, and an application assembly. As the valve is actuated, the material passes through the valve, from the source to the application assembly, and is applied to the field.

Many current systems apply the material in a substantially continuous way. For instance, where the application machine is applying a liquid fertilizer, it actuates the valve to apply a substantially continuous strip of the liquid fertilizer. The same is true of materials that provide other liquid substances, or granular substances, as examples.

A headland or turnrow is the area at each end of a planted field and is one type of a boundary. Planters often create rows in the headland area wherein these rows run perpendicular to the lay of the field. Other types of boundaries include waterways and previously planted areas of a field.

Planter section control turns implement sections on and off wherein the implement sections are assembled with a work machine such as a planter. By reducing product application overlap, section control decreases the total amount of product used in the field, which can lead to lower costs. Additionally, an increase in yields can be seen as there is less competition amongst plants who may suffer in overlapped areas of the field where the seed population is too high. Planter section control can be difficult to adjust in order to align seed, nutrient, fertilizer, or any commodity that is applied to the ground surface with any boundaries without overlap or underlap. Overlap occurs when the seed or commodity is positioned in a location that is passed its intended boundary or target location in the direction of travel of the planter. Underlap occurs when the seed or commodity is positioned in a location that is short of its intended boundary or target location in the direction of travel of the planter. Planter section control is difficult because latencies and tolerance stack-ups in time occur when a large system such as a planter crosses a boundary or target location at a fairly high rate of speed. Latencies occur as the GPS system is mounted on the tractor to measure the tractor position however the row units that dispense the commodity or seed are positioned rearwardly of the tractor. Tolerance stack-ups are the combination of various part dimension tolerances of the planter.

Another reason planter section control is difficult is that a time and global position or actual location that the seed or commodity is deposited onto the ground is unknown with certainty and accuracy. It is known when the seed or commodity system is engaged to begin the distribution process. However it can be difficult to determine with adequate certainty the precise location or time offset from when the commodity delivery system is engaged to when/where the seed or commodity comes to its final resting place on the ground and the actual location of each commodity or seed on the ground. Therefore, it can be hard to predict exactly where commodity or seeds are located with respect to any boundary.

One technique to verify and adjust the location of the dispensed seeds is to manually dig in the ground for the seeds and check the location of the seeds relative to the boundary such as with a tape measure or other devices. This measurement typically requires the operator to stop and exit the planter, then check the location of the seeds or commodity. Based on the speed of the vehicle, distance or spacing between the deposited seeds or commodity, and distance of the seeds or commodity to the boundary, the operator will adjust a time or distance offset to obtain the desired placement with respect to the boundary. This is time consuming and prone to errors.

Mechanical delay is an error inherent to the system. For example, since the motors for the implement sections cannot ramp up instantly to full capacity, the seed or commodity meter and the belt have to overcome inertia and start spinning up, and the seed needs time to fall to the ground that causes some offset from the perfect placement due to the mechanical delay. Another type of mechanical delay relates to placement of the fertilizer relative to the seed or commodity placement in the furrow or vice versa. Fertilizer can be applied prior to seed placement or after seed placement however the intended application location of the fertilizer is on top of or below the seed. Due to the mechanical delay of a fertilizer valve, the fertilizer may not be applied directly under or over the seed. The mechanical delay is always present to some degree and operators manually account for the mechanical delay. However, operators cannot always accurately account for the mechanical delay therefore there is always some error.

Thus there is a need for improvement for planter section control and a need for improvement in accurately accounting for mechanical delay of the fertilizer system or other systems associated with the planter section control. The discussion above is merely provided for general background information and is not intended to be used as an aid in determining the scope of the claimed subject matter.

SUMMARY

According to one embodiment of the present disclosure, a method comprising: emitting a patterned light from a visualization system mounted on a planter row unit onto a trench in a ground surface, wherein the visualization system includes a structured light unit mounted on the planter row unit; depositing a commodity in the trench by the planter row unit; capturing a two-dimensional image of the projected patterned light on the trench with the visualization system that includes a camera mounted on the planter row unit, wherein the two-dimensional image includes the commodity; and determining, with a controller operably connected to the camera, an error placement of the commodity in the two-dimensional image relative to a boundary.

In one example, further comprising: determining, with the controller, a location of the commodity in the trench in the two-dimensional image.

In one example, further comprising: determining, with the controller, whether the commodity captured in the two-dimensional image is a boundary commodity.

In one example, further comprising: determining, with the controller, whether the error placement is acceptable or unacceptable; in response to the error placement being unacceptable, adjusting a mechanical delay offset factor of a planter section control coupled with the planter row unit.

In one example, wherein the planter row unit is coupled to an agricultural work machine, the planter section control includes a commodity delivery system coupled to the controller and the agricultural work machine.

In one example, wherein the adjusting the mechanical delay offset factor of the planter section control is performed automatically by the controller.

In one example, wherein the adjusting the mechanical delay offset factor of the planter section control is performed by an operator.

In one example, wherein the error placement is an underlap condition of the commodity relative to the boundary.

In one example, wherein the error placement is an overlap condition of the commodity relative to the boundary.

According to one embodiment of the present disclosure, a method comprising: emitting a patterned light from a visualization system mounted on a planter row unit onto a ground surface, wherein the visualization system includes a structured light unit mounted on the planter row unit; depositing a commodity in the ground surface by the planter row unit; capturing a two-dimensional image of the projected patterned light on the trench with the visualization system that includes an imaging unit mounted on the planter row unit, wherein the two-dimensional image includes the commodity; and determining, with a controller operably connected to the camera, whether the commodity captured in the two-dimensional image is a boundary commodity relative to a boundary.

In one example, further comprising: in response to the commodity being the boundary commodity, determining with the controller, an error placement of the boundary commodity in the two-dimensional image relative to the boundary.

In one example, further comprising: determining, with the controller, whether the error placement is acceptable or unacceptable; in response to the error placement being unacceptable, adjusting a mechanical delay offset factor of a planter section control coupled with the planter row unit.

In one example, wherein the planter row unit is coupled to an agricultural work machine, the planter section control includes commodity delivery system coupled to the controller and the agricultural work machine.

In one example, further comprising: determining a desired error of placement that includes a desired distance for depositing the boundary commodity relative to the boundary; determining whether the error placement of the boundary commodity in the two-dimensional image relative to the boundary is greater than the desired error of placement; in response to the error placement being greater than the desired error of placement, adjusting a mechanical delay offset factor of a planter section control coupled with the planter row unit.

In one example, wherein in response to the error placement being less than the desired error of placement, alerting an operator of this condition.

In one example, wherein the error placement is an underlap condition of the boundary commodity relative to the boundary.

In one example, wherein the error placement is an overlap condition of the boundary commodity relative to the boundary.

In one example, further comprising: in response to the commodity being the boundary commodity, determining with the controller, a geographical identification metadata of each of the boundary commodity in the trench in the two-dimensional image and the boundary.

In one example, wherein the planter section control is operably coupled to one or more of a hopper, a seed meter, and a seed delivery system, or other systems coupled with the planter row unit that are included in the mechanical delay offset factor.

In one example, wherein the adjusting the mechanical delay offset factor of the planter section control is performed automatically by the controller.

In one example, wherein the adjusting the mechanical delay offset factor of the planter section control is performed by an operator.

According to one embodiment of the present disclosure, a method comprising: emitting a patterned light from a visualization system mounted on a planter row unit onto a trench in a ground surface, wherein the visualization system includes a structured light unit mounted on the planter row unit; depositing a commodity in the trench by the planter row unit; capturing a two-dimensional image of the projected patterned light on the trench with the visualization system that includes a camera mounted on the planter row unit, wherein the two-dimensional image includes the commodity; depositing a product in the trench by the planter row unit; capturing a two-dimensional image of the projected patterned light on the trench with the visualization system, wherein the two-dimensional image includes the product; determining, with a controller operably connected to the camera, a location of the commodity in the two-dimensional image; and determining, with the controller, a product characterization of the product in the two-dimensional image.

In one example, wherein the commodity and the product are captured in the same two-dimensional image.

In one example, wherein the commodity is captured in one of the two-dimensional image and the product is captured in a second of the two-dimensional image.

In one example, wherein the product is any of a fertilizer, a liquid material, a granular material, or a herbicide material.

In one example, further comprising: determining, with the controller, an error characterization of the product characterization relative to the location of the commodity in the two-dimensional image; and determining, with the controller, whether the error characterization is within an acceptable range or an unacceptable range.

In one example, wherein the product characterization includes any of a length, a width, an area, or a depth of the product as determined from the two-dimensional image.

In one example, further comprising: in response to the error characterization being in the unacceptable range, adjusting a mechanical delay offset factor of any of a planter section control, a commodity delivery system, or a product delivery system coupled with the planter row unit and the controller.

In one example, wherein the adjusting the mechanical delay offset factor is performed automatically by the controller.

In one example, wherein the unacceptable range of the error characterization is greater than 5 inches.

In one example, wherein the error characterization is in the acceptable range that is between 0 and 5 inches.

In one example, wherein the product characterization is a band of fertilizer having a length, wherein the commodity is a seed, wherein the error characterization indicates a placement of the band of product in the two-dimensional image relative to a location of the commodity in the two-dimensional image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

Corresponding reference numerals are used to indicate corresponding parts throughout the several views.

DETAILED DESCRIPTION

Figure 1:
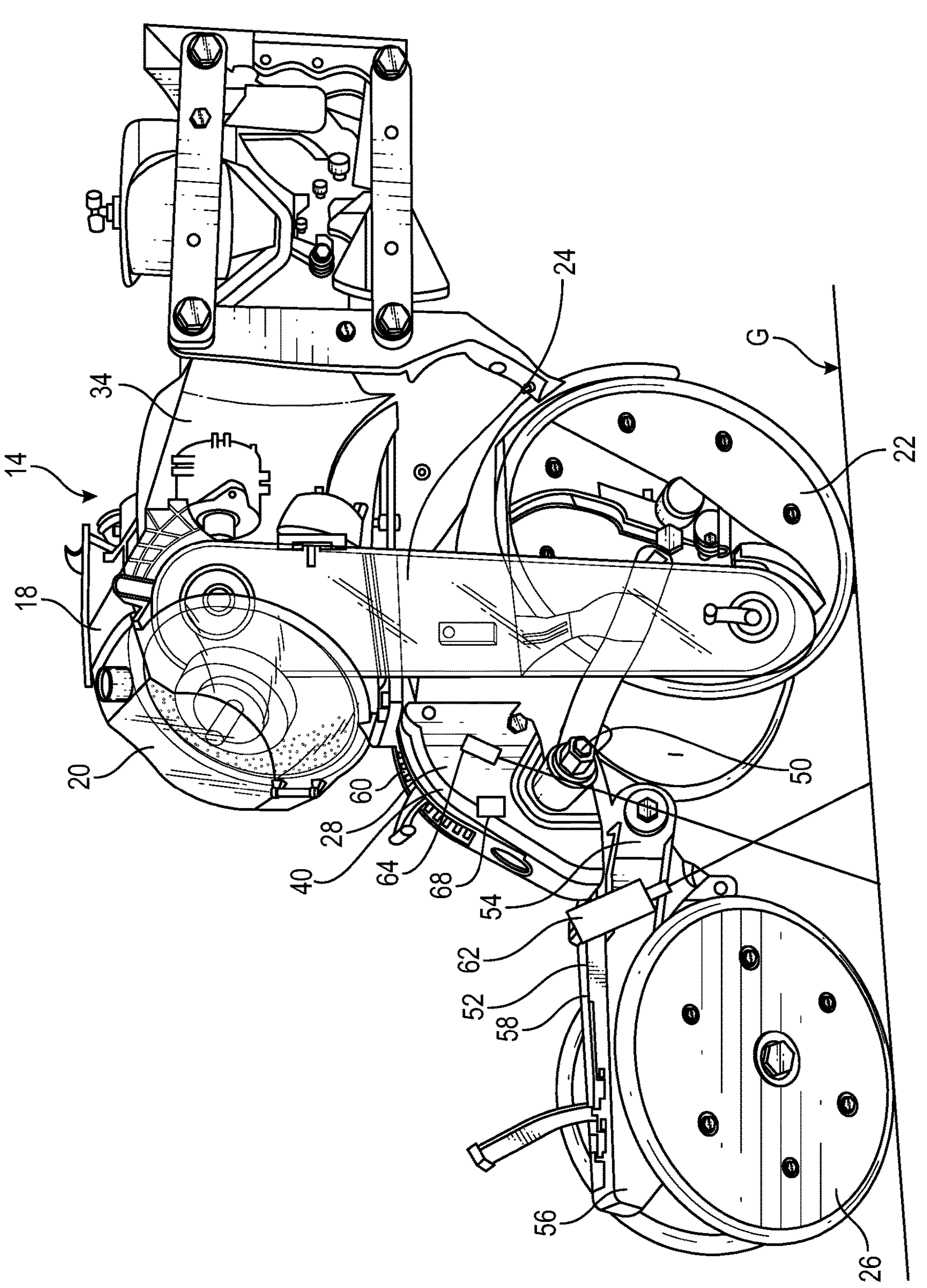
FIG. 1 is a side view of a visualization system mounted on a planter row unit.

Some of the benefits of the present disclosure include using an optical sensing device such as a visualization system in combination with a precise global timestamp or GPS geospatial tag, to determine a precise place or location and/or time that commodities are placed with respect to a boundary and thereby adjust planter section control by an operator or automatically. The planter section control includes a mechanical shut-off device coupled to a controller and a GPS receiver device on the agricultural work machine. The shut-off device can be a single row clutch mounted on every row unit, an electronic shut-off device that controls a section or multiple rows of the planter row units, or a turn-on device to start the commodity flow or placement. In one embodiment, wherein the shut-off device is the single row clutch then the clutch is disengaged to start the flow of the commodity.

The visualization system can sense the boundary or the boundary may be determined by an operator or automatically. The image processing performed by the visualization system determines precisely where the first or last seed or commodity was planted in relationship to the boundary. The timing of subsequent starting and stopping of the section control, or mechanical shut-off and turn-on, is adjusted based on an error placement between an actual commodity relationship to the boundary and a desired commodity relationship to boundary. In some embodiments, the actual commodity relationship is the same as the desired commodity relationship. The boundary can be set by the operator or determined by the visualization system. The boundary can include waterways, previously planted areas of a field, headland areas, or other areas. The boundary forms a geofence and is known by the global timestamp or GPS geospatial tag.

The visualization system and in some embodiments a controller coupled to the visualization system determines an error placement based on a boundary commodity that is closest to or intended to be deposited on the boundary wherein the boundary is the desired location of the boundary commodity. The visualization system determines from images that include the boundary commodity and the GPS location of the boundary relative to the boundary commodity a time and/or place or location that the boundary commodity should be deposited relative to the boundary. The visualization system and in some embodiments a controller coupled to the visualization system determines any adjustments needed for the planter section control to optimize placement or deposition of future or additional boundary commodities relative to the boundary to position the boundary commodities close to the boundary or desired location. The visualization system and in some embodiments a controller coupled to the visualization system optimizes the error placement to minimize the distance between the boundary commodity and the boundary.

The present disclosure adjusts the planter section control, via automatically or by an operator, to turn one or more implement sections on and off to position the boundary commodity placement close to the boundary. The adjustment or mechanical delay offset factor time to turn the implement sections on or off can be small increments such as seconds, milli-seconds, or any increment that is deemed effective to optimize the boundary commodity placement relative to the boundary. As the planter or agricultural work machine travels over a field, the locations of the boundary and the boundary commodity can change so adjustment or mechanical system delay time of the one or more implement sections can change. In some embodiments, the velocity of planter or agricultural work machine does not change. Adjustment of the mechanical system delay for the implement sections to shut off or turn on is based on comparison placement of the boundary commodity in the image to the known position or location of the boundary. For example, the present disclosure determines if the mechanical system delay time is starting one second too late, then the controller or operator can adjust the mechanical system delay time to start one second earlier to compensate.

Mechanical delay is an error inherent to the system. For example, since the motors for the implement sections cannot ramp up instantly to full capacity, the seed or commodity meter and the belt have to overcome inertia and start spinning up, and the seed needs time to fall to the ground that causes some offset from the perfect placement due to the mechanical delay. The mechanical delay is measured and the present application compensates for it via the mechanical delay offset factor that adjusts the timing to compensate for the mechanical delay. The mechanical delay is always present to some degree however the present application accounts for the mechanical delay via the visualization system and the adjustment of the mechanical delay offset. For example, the visualization system determines that a seed placement is off a certain distance such as 3" due to the mechanical delay so the system is turned on 0.5 seconds earlier to account for that known delay.

In one exemplary embodiment, a planter row unit coupled to the planter or agricultural work machine travels over a field and deposits a boundary commodity near the boundary. The visualization system takes an image of the boundary commodity and determines an error of placement of the boundary commodity relative to the GPS location of the boundary. The visualization system and/or a controller can also determine a GPS location of the boundary commodity for the error of placement. Or the visualization system and/or a controller can determine a location of the boundary in the image that includes the boundary commodity. Based on the error of placement, an operator or the controller will make an adjustment to mechanical system delay time. The planter row unit will then place a new boundary commodity and check a placement or location of the new boundary commodity in an image relative to the new boundary to determine a subsequent error placement. If the subsequent error placement is not acceptable, then the controller or operator will make another adjustment to mechanical system delay time until the measurement/placement of the new boundary commodity in the image relative to the boundary is within a "tolerance". The tolerance can be set by operator or automatically.

In another exemplary embodiment, an operator or the controller determines one or more or all of geolocations or geospatial tags of desired commodity placement prior to actual placement of the commodity. Next, the operator or controller determines a geolocation or geospatial tag of the boundary. As the planter row unit deposits the commodity in the field, the visualization system georeferences the actual commodity in the images captured by the visualization system. The visualization system and/or controller compares the georeferenced location of the actual commodity in the image and the prescribed geolocation of commodity placement. In particular, the visualization system and/or controller determines an error of placement for the boundary commodity relative to the boundary. Based on the error of placement, the planter section control is adjusted to turn implement sections on and off.

Figure 2:
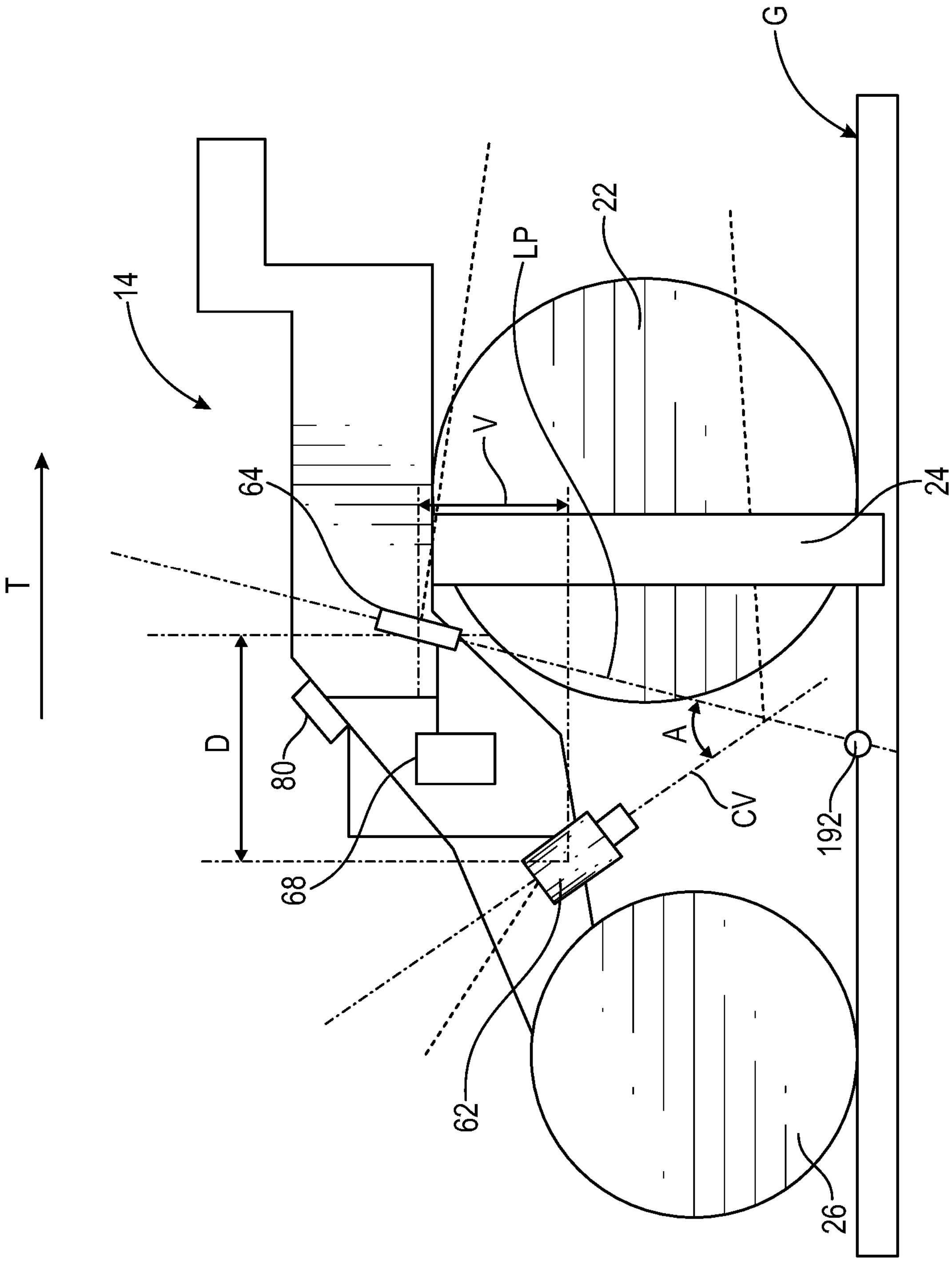
FIG. 2 is a side view of the visualization system mounted on the planter row unit of FIG. 1.
Figure 3:
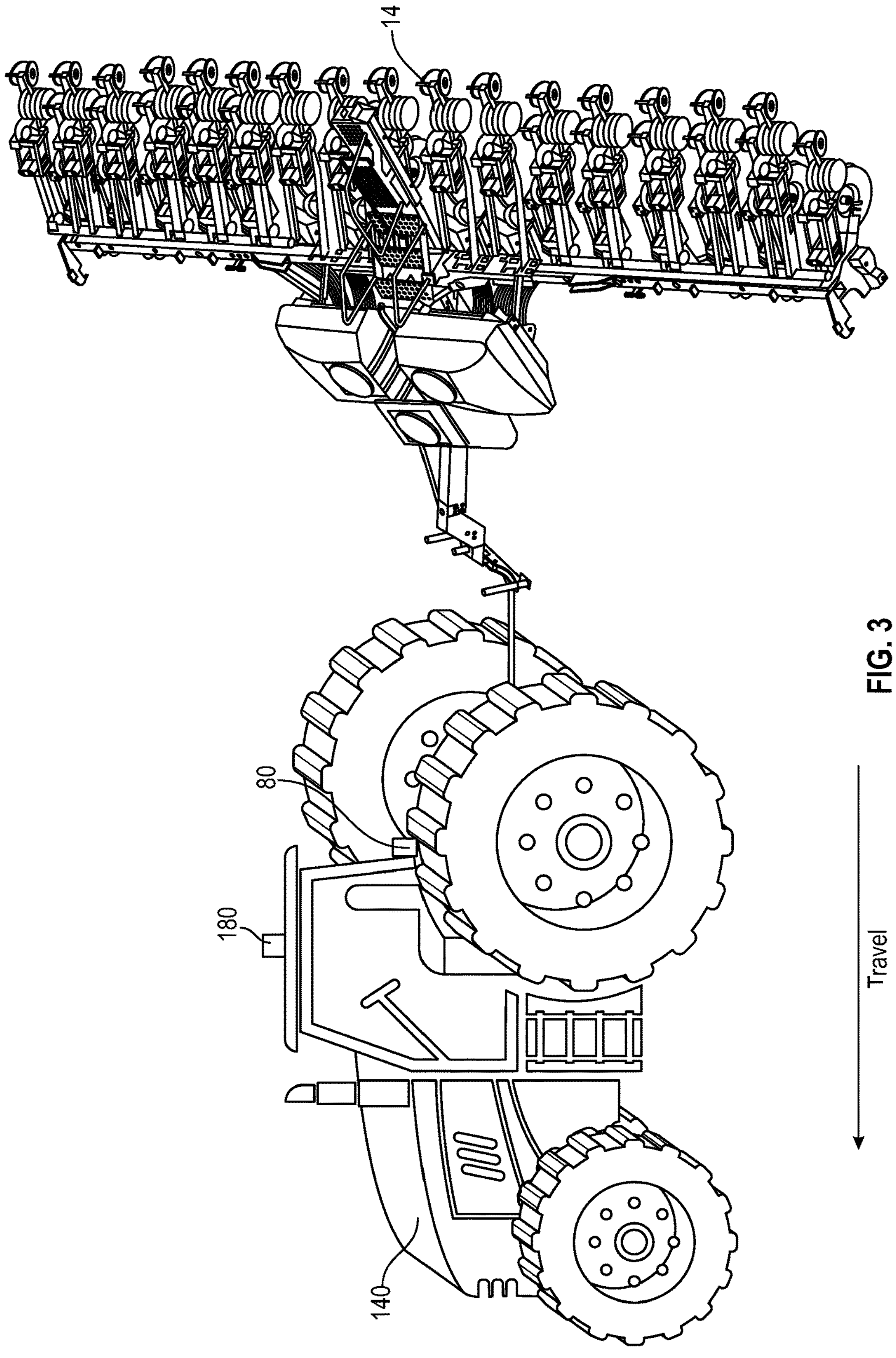
FIG. 3 is a side view of the visualization system mounted on the planter row unit of FIG. 1 wherein the planter row unit is coupled to a tractor.

Referring now to FIGS. 1, 2, and 3, an embodiment of a planter row unit 14 is coupled to an agricultural work machine 140 such as a tractor. The planter row unit 14 is an illustrative embodiment wherein other embodiments of planter row units can be used with the present disclosure. In FIG. 1, only a single planter row unit 14 is shown, but a plurality of planter row units 14 may be coupled to a frame of the agricultural work machine 140 in any known manner. The planter row unit 14 may be coupled to the frame by a linkage (not illustrated) so that the planter row unit 14 can move up and down to a limited degree relative to the frame.

Each planter row unit 14 may include an auxiliary or secondary hopper 18 for holding product such as fertilizer, seed, chemical, or any other known product or commodity. In this embodiment, the secondary hopper 18 may hold seed. As such, a seed meter 20 is shown for metering seed received from the secondary seed hopper 18. A furrow opener or furrow opening disk 22 may be provided on the planter row unit 14 for forming a furrow or trench in a field for receiving metered seed (or other product) from the seed meter 20. The seed or other product may be transferred to the trench from the seed meter 20 by a seed delivery system 24. In one embodiment, a closing system or closing wheel 26 may be coupled to each planter row unit 14 and is used to close the furrow or trench with the seed or other product contained therein. The closing system includes a closing wheel but in other embodiments the closing system can include closing disks, closing tires, and/or drag chains to name a few examples.

In one embodiment, the seed meter 20 is a vacuum seed meter, although in alternative embodiments other types of seed meters using mechanical assemblies or positive air pressure may also be used for metering seed or other product. As described above, the present disclosure is not solely limited to dispensing seed. Rather, the principles and teachings of the present disclosure may also be used to apply non-seed products to the field. For seed and non-seed products, the planter row unit 14 may be considered an application unit with a secondary hopper 18 for holding product, a product meter for metering product received from the secondary hopper 18 and an applicator for applying the metered product to a field. For example, a dry chemical fertilizer or pesticide may be directed to the secondary hopper 18 and metered by the product meter 20 and applied to the field by the applicator.

Figure 4:
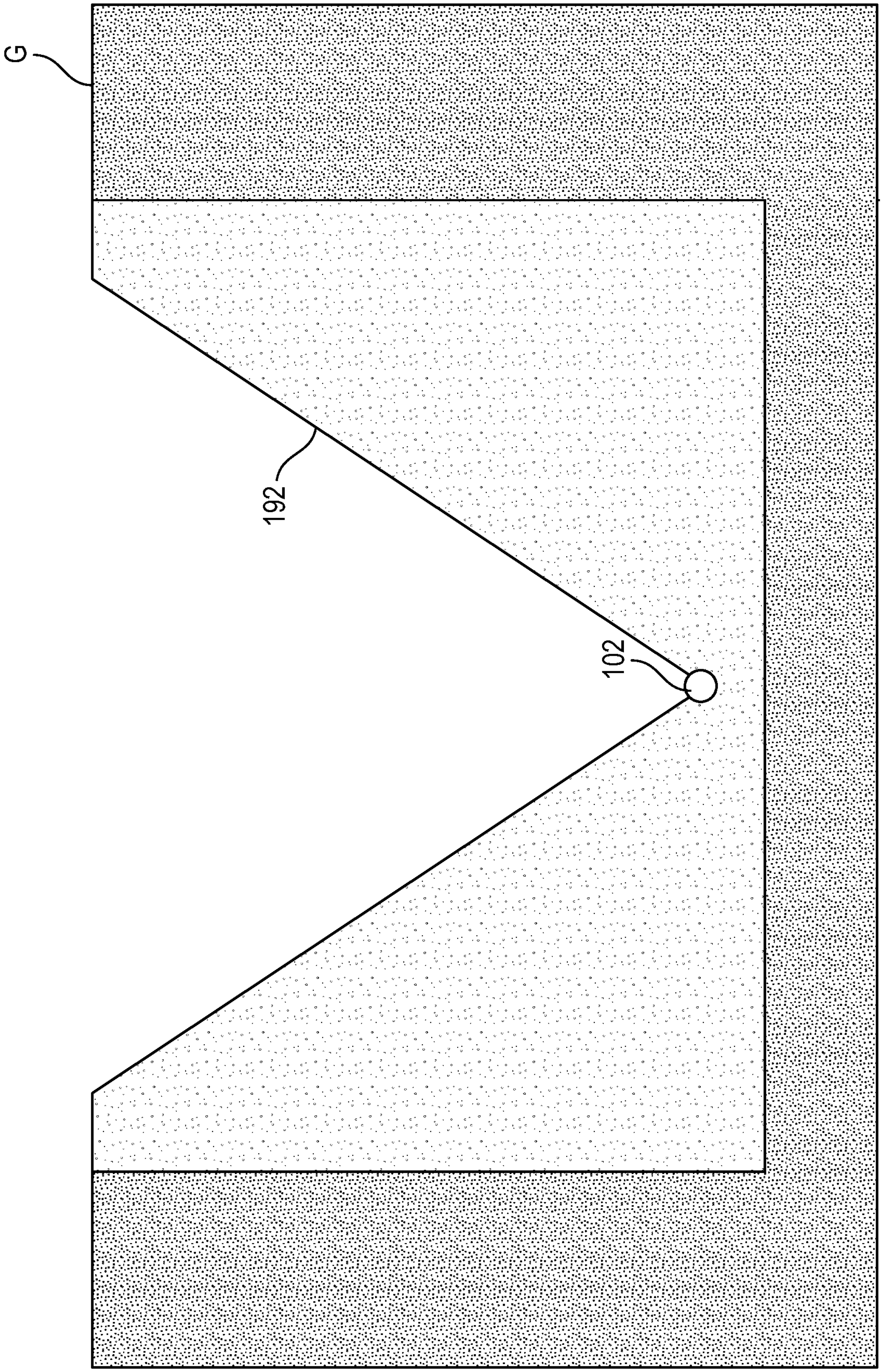
FIG. 4 is a cross-sectional view of a trench profile as determined by the visualization system of FIG. 1.

The planter row unit 14 includes a shank 40. The shank 40 is coupled to a closing wheel frame 52. The closing wheel frame 52 has a pivot end 54 that is pivotably connected to a pivot 49 and an opposite end 56 with a body portion 58 that spans between the pivot end 54 and the opposite end 56. The planter row unit 14 includes a pair of furrow opening disks 22 rotatably mounted on the shank 40 and a pair of closing wheels 26 rotatably mounted on the closing wheel frame 52. The planter row unit 14 can also include a pair of gauge wheels but those are not illustrated. The pair of furrow opening disks 22 form a trench or furrow 192 in the field or in a ground surface G during operation of the planter row unit 14. Alternatively, other opening devices can be used in place of the pair of furrow opening disks 22. The trench 192 has a cross-sectional shape as a V shape as illustrated in FIG. 4. In yet another embodiment, the trench 192 can have other cross-sectional shapes. The pair of closing wheels 26 close or cover the trench or furrow 192 with displaced soil that occurs from the pair of furrow opening disks 22 opening or forming the trench 192 in the ground surface G. Alternatively, other closing devices can be used in place of the pair of closing wheels 26.

An exemplary configuration of a visualization system 60 is operably connected and mounted to the planter row unit 14 is illustrated in FIGS. 1 and 2 and described next. The visualization system 60 includes a camera or imaging unit 62 and a structured light unit 64 wherein the camera or imaging unit 62 is laterally or horizontally offset a distance D from the structured light unit 64. In the illustrated embodiment, the camera or imaging unit 62 is vertically offset a distance V from the structured light unit 64. In one embodiment, the horizontal and vertical distances D and V are very small such that the camera or imaging unit 62 and the structured light unit 64 are very close to one another and can be assembled in a visualization kit that includes a package or container that holds the camera or imaging unit 62 and the structured light unit 64 that is mounted on the planter row unit 14. In other embodiments, the camera or imaging unit 62 is not vertically offset from the structured light unit 64 such that V is zero distance. In the illustrated embodiment in FIG. 2, the camera or imaging unit 62 has a principle optical axis CV that intersects with a light plane LP from the structured light unit 64 to form an angle A there between. The angle A can be less than 90 degrees, 90 degrees, or an obtuse angle. In other embodiments, the camera or imaging unit 62 is oriented such that the principle optical axis CV is close to the trench 192 or may be oriented towards the closing wheels 26. In any embodiment, the principle optical axis CV of the camera or imaging unit 62 may or may not intersect the light plane LP from the structured light unit 64. The principle optical axis CV is along a centerline of a field of view of the camera or imaging unit 62. In any of these embodiments, the field of view of the camera or imaging unit 62 is arranged to capture images of the patterned light from the structured light unit 64 that intersects with the trench 192 at the ground surface G.

Although one camera or imaging unit 62 is illustrated, additional cameras 62 can be used with the structured light unit 64. The camera or imaging unit 62 is mounted between the pair of closing wheels 26 and the pair of furrow opening disks 22 or alternatively the camera or imaging unit 62 is mounted between the pair of closing wheels 26 and the seed delivery system 24. The structured light unit 64 is also mounted between the pair of closing wheels 26 and the pair of furrow opening disks 22 or alternatively the structured light unit 64 is mounted between the pair of closing wheels 26 and the seed delivery system 24. In the illustrated embodiment, the camera or imaging unit 62 is positioned close to the pair of closing wheels 26 and the structured light unit 64 is positioned close to the seed delivery system 24 and/or the pair of furrow opening disks 22. In other embodiments, the structured light unit 64 is positioned close to the pair of closing wheels 26 and the camera or imaging unit 62 is positioned close to the seed delivery system 24 and the pair of furrow opening disks 22.

In some embodiments, the visualization system 60 includes a general illumination light 68 mounted to the planter row unit 14. The general illumination light 68 can include one or more light emitting diodes (LED) or broad-beamed, high intensity artificial light. The general illumination light 68 can illuminate the trench 192 to help capture the visual context of the trench 192 by the camera or imaging unit 62. The general illumination light 68 can be used with the structured light unit 64. Imaging by the camera or imaging unit 62 can be performed with alternating light sources such that the structured light unit 64 is operable while the general illumination light 68 is non-operable, and vice versa wherein the structured light unit 64 is non-operable while the general illumination light 68 is operable. Non-operation of the general illumination light 68 during operation of the structured light unit 64 enables the camera or imaging unit 62 to capture a 2D image where the pattern created by the structured light unit 64 stands out significantly from the rest of the background. Non-operation of the structured light unit 64 during operation of the general illumination light 68 enables the camera or imaging unit 62 to capture a better image of the visual context of the trench 192 by the camera or imaging unit 62. Alternatively, the general illumination light 68 and the structured light unit 64 can be operational together. For example, the structured light unit 64 is activated while the camera or imaging unit 62 captures images however the general illumination light 68 is not operational for every image that is captured by the camera or imaging unit 62. As a further example, the general illumination light 68 can be operational for some of the images that are captured and non-operational for other of the images that are captured by the camera or imaging unit 62. The general illumination light 68 is placed between the pair of closing wheels 26 and the pair of furrow opening disks 22. The general illumination light 68 can alternatively be mounted or combined with the camera or imaging unit 62. The general illumination light 68 can be placed under the shank 40 or under the closing wheel frame 52. The general illumination light 68 can be placed anywhere on the planter row unit 14 to illuminate a field of view of the camera or imaging unit 62.

In any embodiment, the camera or imaging unit 62 is oriented to point down towards the ground surface G at the trench 192 that is formed by the pair of furrow opening disks 22. The camera or imaging unit 62 also points down toward the projected light from the structured light unit 64 at the trench 192 in the ground surface G. The structured light unit 64 projects a narrow band of light across the trench 192 to produce a line of illumination or patterned light and can be used for location of a seed or commodity 102 therein and location of a boundary 200. The structured light unit 64 points towards the ground surface G and the trench 192 formed therein. In any embodiment, the structured light unit 64 and the camera or imaging unit 62 are accurately calibrated relative to each other so that 3D locations of the commodity 102, the trench 192, and the boundary 200 can be recovered by triangulation or other techniques.

The structured light unit 64 includes a single laser or single light source that projects a single line, multiple lines, grids, stripes, one or more dots or point projections, cross, triangle, or other known pattern of light, collectively "patterned light" on the trench in the ground surface G. Alternatively, the structured light unit 64 can include multiple lasers or light sources. For example, the structured light unit 64 can emit a single point projection to a trench bottom for determining a trench depth or commodity location. As another example, the structured light unit 64 can emit a single line projection for measuring cross-section of the trench as well as the trench depth or the commodity location. As yet another example, the structured light unit 64 can emit an area projection such as multiple lines, grids, or stripes for measuring a location of the commodity 102, the trench 192, and the boundary 200 at various points within the measured section. In one embodiment, a slit in a light cover can be positioned in front of the structured light unit 64 to thereby project multiple lines on the trench 192 to provide additional points, mesh, or an area of 3D points to perform a multiple cross sectional measurement. Multiple lines may be beneficial in a dusty environment to increase the potential to obtain a good measurement. The structured light unit 64 can also pass through a digital spatial light modulator to form a pattern with regular and equidistant stripes of light on the trench 192. In one embodiment, projection by the structured light unit 64 of a single line as the planter row unit 14 moves towards the direction of laser scanning T for additional scanning of cross sectional measurements and measurement of the commodity 102.

In one embodiment, the structured light unit 64 is a green light but in other embodiments the structured light unit 64 can be another colored light such as blue or a white light. If the structured light unit 64 is configured as a colored light, then the camera or imaging unit 62 is a color or monochrome camera. Alternatively, the structured light unit 64 can be a near-infrared (NIR), infrared (IR), or other non-visible range for better visibility in challenging or obstructive environmental conditions such as dust, fog, or haze wherein the NIR or IR light is used with the camera or imaging unit 62 being infrared or near-infrared. As such, the camera or imaging unit 62 and the structured light unit 64 can be operated in the visible spectrum range, or outside of the visible spectrum range such as infrared range in order to have better air obscurant penetration such as dust penetration. While the trench 192 is formed by the furrow opening disks 22, soil and dust can fill or permeate the air so it is difficult for the operator or a conventional color camera to capture the trench 192 cross-sectional shape. A near infrared camera or imaging unit 62 can be used in dusty or visibly challenging environments to improve the visualization of the 2D plane that is projected by the structured light unit 64.

In certain embodiments, the visualization system 60 includes or is operatively connected to a controller 80 structured to perform certain operations to control the camera or imaging unit 62, the structured light unit 64, and the general illumination light 68. The controller 80 can be placed anywhere on the planter row unit 14, the planter, the agricultural work machine or tractor 140, or any work machine that may be connected to or capable of performing one or more planting operations. In certain embodiments, the camera or imaging unit 62 includes the controller 80. In certain embodiments, the controller 80 forms a portion of a processing subsystem including one or more computing devices having memory, processing, and communication hardware. The controller 80 may be a single device or a distributed device, and the functions of the controller 80 may be performed by hardware or by instructions encoded on computer readable medium. The controller 80 may be included within, partially included within, or completely separated from other controllers (not shown) associated with the work machine and/or the visualization system 60. The controller 80 is in communication with any sensor or other apparatus throughout the visualization system 60, including through direct communication, communication over a datalink, and/or through communication with other controllers or portions of the processing subsystem that provide sensor and/or other information to the controller 80.

Figure 5:
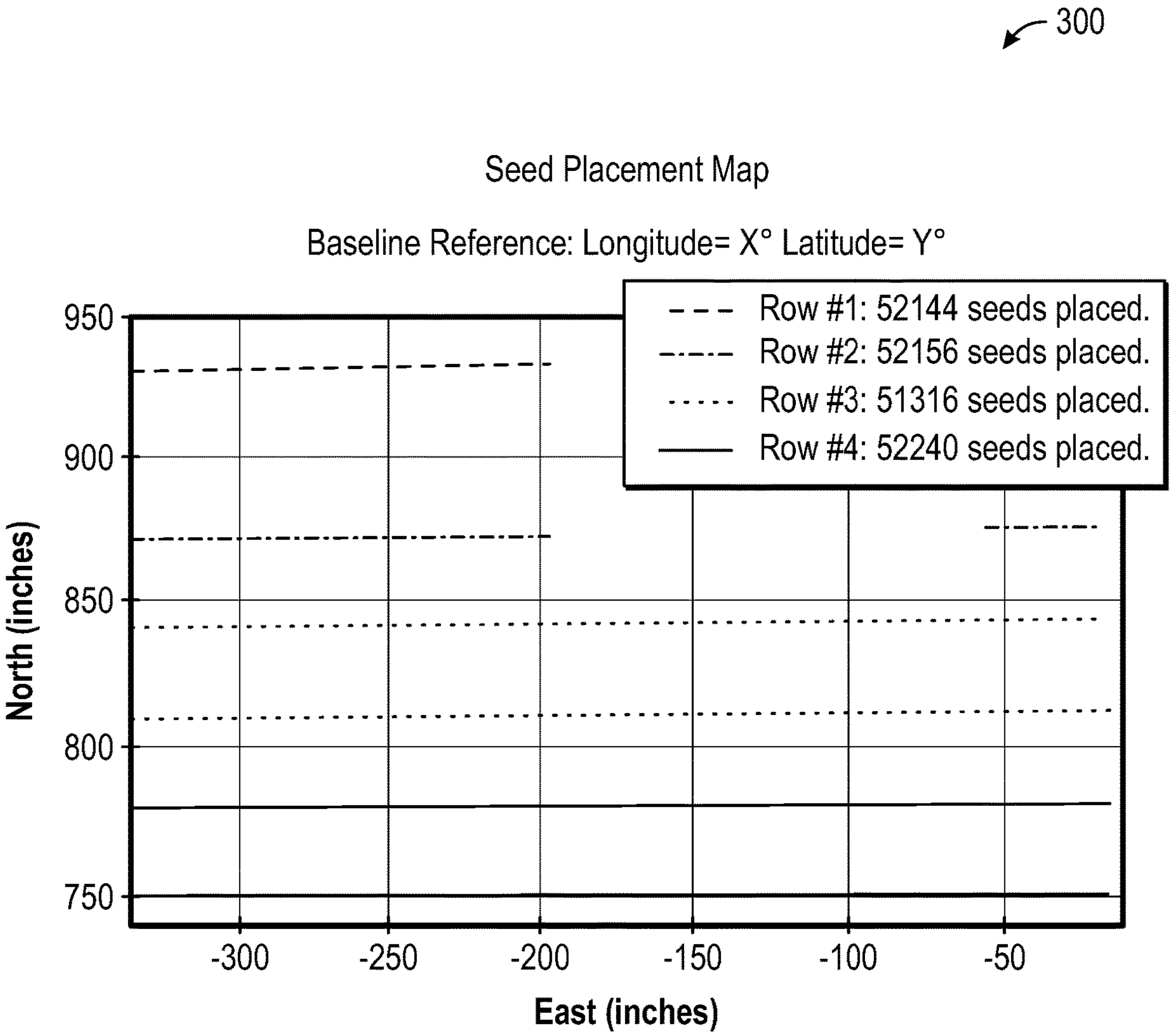
FIG. 5 is an illustrative embodiment of a seed map as determined by the visualization system mounted on the planter row unit of FIG. 1.

The vehicle controller 80 can include a GPS device or be operably coupled with a GPS device 180 (FIG. 3) to enable location-based field registration and mapping of commodity or seed placement, depth estimation, and location based images on a map 300 from the captured images as illustrated in FIG. 5. Alternatively, in other embodiments, the visualization system 60 includes a GPS device. A planter section control (not illustrated) includes a mechanical shut-off device coupled to the controller 80 and a GPS receiver device on the agricultural work machine 140. The GPS receiver can be the GPS device 180. The shut-off device can be a single row clutch mounted on every row unit or an electronic shut-off device that controls a section or multiple rows of the planter row units.

The location-based field registration or map 300 can also account for the velocity of the planting vehicle or the agricultural work machine 140 at the time any images were captured. The map 300 is illustrative of one exemplary map however it is contemplated that other types of maps can be configured as desired, and based on the individual field, commodity application, and GPS coordinates, to name a few characteristics of the map 300.

In some embodiments, images and determined metrics may be tagged or geotagged during registration with GPS information producing the field map 300. For example, the images with the commodity 102 and the trench 192 may be geotagged to include geographical identification metadata to various media such as a geotagged photograph or video, websites, SMS messages, QR Codes or RSS feeds and is a form of geospatial metadata. This data usually consists of latitude and longitude coordinates, though they can also include altitude, bearing, distance, accuracy data, and place names, and perhaps a time stamp. Geotagging can help users find a wide variety of location-specific information from a device. The geographical location data used in geotagging can be derived from the GPS device 180. In many embodiments, a user experience interface such as in the agricultural work machine 140 may comprise a processor enabled display system wherein the processor executes computer readable instructions to produce visualized output illustrating of a plurality of captured data including the map 300, the image 100, and the boundary 200.

Another aspect of the present application provides systems and methods for automatically adjusting planter components or mechanical delay offset factor of the planter section control in response to determined seeding or commodity measurements and/or GPS locations of the seed or commodity 102 relative to the boundary 200 based on images captured by the visualization system 60. These systems and methods determine an error placement between a boundary commodity to the boundary 200 and a desired boundary commodity to the boundary 200. These systems and methods can then adjust the mechanical delay offset factor of the mechanical systems of the mechanical systems of the planter row unit 14 accordingly until the error placement is acceptable. The adjustments to the mechanical delay offset factor of the mechanical systems of the planter row unit 14 can be made by an operator or automatically such as by the controller 80.

In certain embodiments, the controller 80 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In some embodiments, the visualization system 60 is operably connected to a mobile device (not illustrated) such as a mobile phone, computer, laptop, or electronic tablet that includes a user interface for operably engaging with the visualization system 60 and the operator; however, in other embodiments the visualization system 60 is not connected to the mobile device. The user interface of the mobile device can display the same display as a user interface in the agricultural work machine 140 or a different display.

Figure 6:
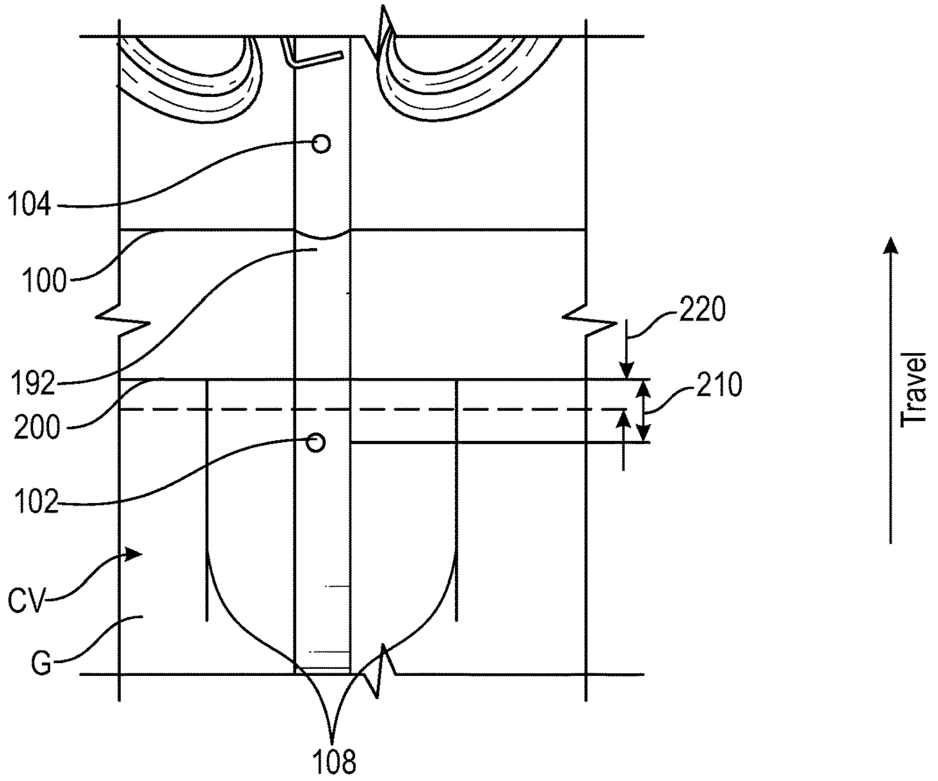
FIG. 6 is a first embodiment of a camera field of view of a furrow by the visualization system of FIG. 1 with a boundary.
Figure 7:
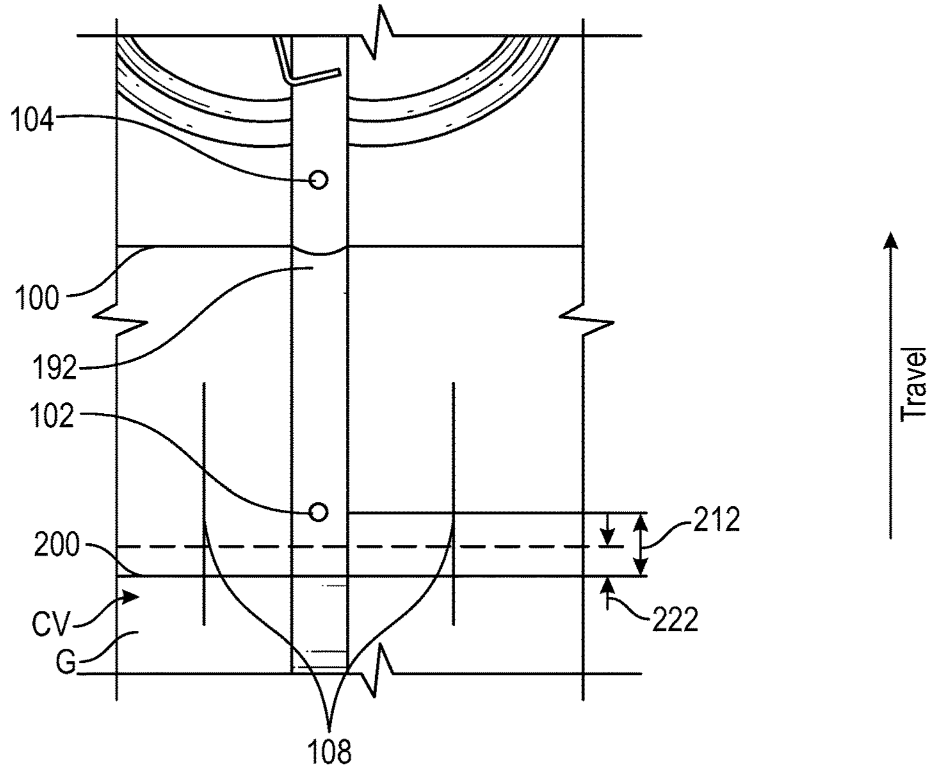
FIG. 7 is a second embodiment of a camera field of view of a furrow by the visualization system of FIG. 1 with a boundary.

FIGS. 6 and 7 illustrate the camera field of view CV that includes the trench or furrow 192 in the field or in the ground surface G, the seed or commodity 102 and a subsequent seed or commodity 104 placed in the trench 192, and the direction of travel T of the agricultural work machine 140. In FIGS. 6 and 7, the seed or commodity 102 is considered a boundary commodity in that the ideal or intended location for this specific commodity is on the boundary 200. The structured light unit 64 projects a single line laser or a two-dimensional (2D) laser or light plane LP of light toward the ground surface G, and an image 100 illustrated as a line. The image 100 is a single line in FIGS. 6 and 7, but more complicated patterns such as multiple lines, grids, or dots could be used in order to have more 3D points. In the illustrated embodiment, the visualization system 60 includes another light source that projects a pair of guideline lights 108 that are positioned exterior to the trench or furrow 192. The pair of guideline lights 108 assist the operator driving the agricultural work machine 140 and/or the visualization system 60 to maintain the camera field of view CV positioned or oriented along the trench or furrow 192. The pair of guideline lights 108 may not be present in other embodiments. In some embodiments, a marker such as a ruler or a coin can be displayed in the image 100 for a reference scale or to represent relative location of the center of the camera field of view CV.

FIGS. 6 and 7 also illustrate the boundary 200 as determined by any of the visualization system 60, the controller 80, user input, global timestamping, GPS geospatial tag, or other techniques, wherein the boundary 200 is representative of the location in the ground surface G in which the commodity 102 is intended to be deposited. In FIG. 6, an error of placement 210 is the distance from the boundary 200 to the commodity 102, i.e., the boundary commodity. The error of placement 210 illustrates an underlap in FIG. 6. In FIG. 7, an error of placement 212 is the distance from the boundary 200 to the commodity 102, i.e., the boundary commodity. The error of placement 212 illustrates an overlap. The errors of placement 210 and 212 are actual distance differences between the commodity 102 and the boundary 200.

In some embodiments, a desired error of placement 220 and 222 is determined as illustrated in FIGS. 6 and 7. The desired error of placement 220 and 222 is a desired distance for deposition of the commodity 102 to the boundary 200. The desired errors of placement 220 and 222 are preferable distances in which the commodity 102 is deposited to the boundary 200. In some embodiments, the desired errors of placement 220 and 222 is set by an operator. In some embodiments, the desired errors of placement 220 and 222, respectively, are the same as the errors of placement 210 and 212, respectively.

Figure 8:
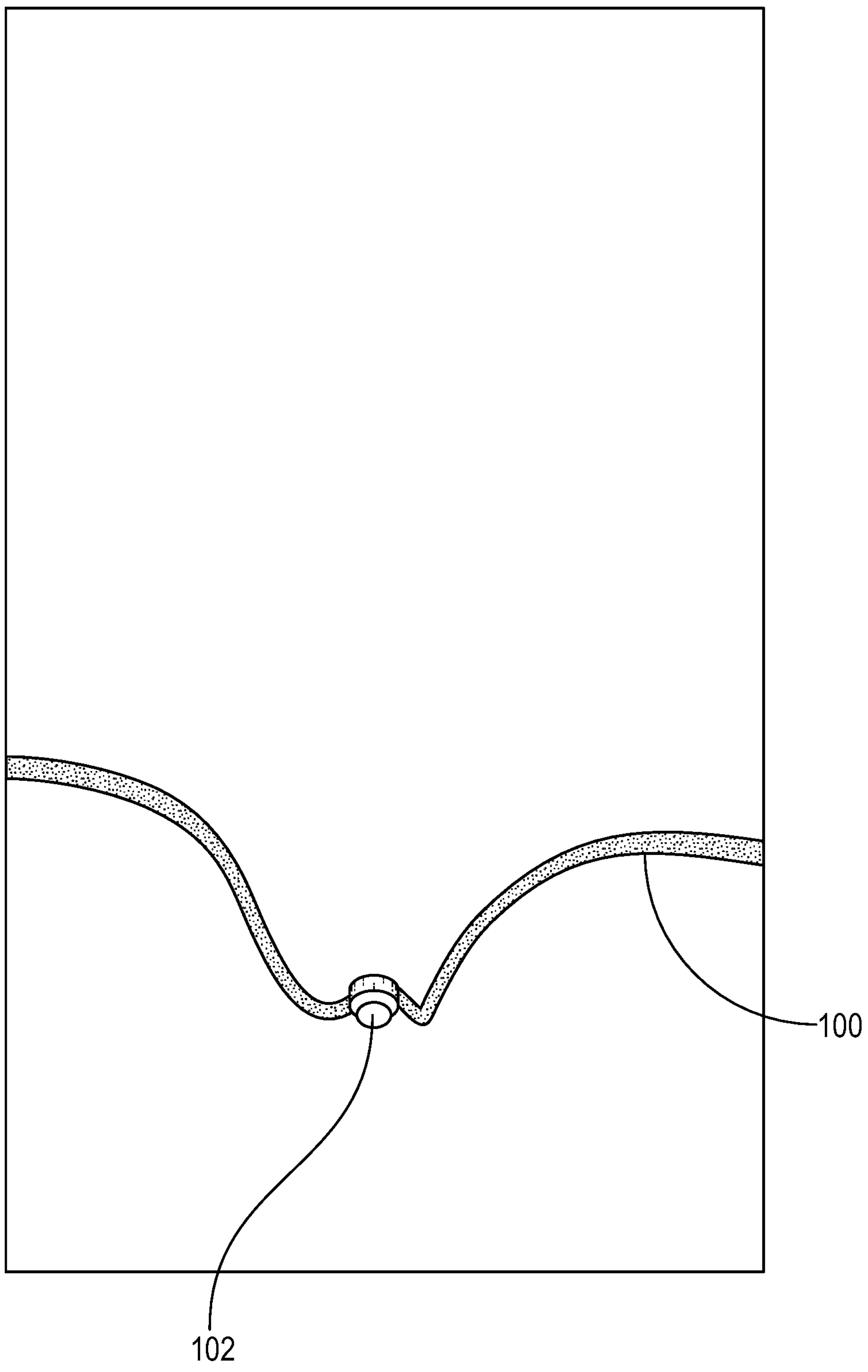
FIG. 8 is an image that is projected by a structured light unit of the visualization system of FIG. 1.

Measurement of the location of the commodity 102 will now be described by measuring the three-dimensional (3D) location of the laser points or patterned light of an image 100 that is projected by the structured light unit 64 as illustrated in FIG. 8. In one form, the measurement of the location of the commodity 102 is determined by using structured-light based sensing. In the embodiment wherein the structured light unit 64 projects a single line laser, the structured light unit 64 emits patterned light (see FIG. 2) toward the ground surface G, and the image 100 illustrated as a line (see FIG. 8) is the intersection of the laser plane LP and the location of the commodity 102 in the ground surface G. The image 100 is a single line in FIG. 8, but more complicated patterns such as multiple lines, grids, or dots, or any type of patterned light previously discussed could be used in order to have more or less 3D points. The camera or imaging unit 62 captures the image 100 of the trench 192 with the commodity 102 therein with the projected patterned light. The geometric relationship between the laser or light plane LP projected by the structured light unit 64 and the principle optical axis CV of the camera or imaging unit 62 is determined by the location and orientation of the camera or imaging unit 62 and the structured light unit 64 relative to each other, therefore the 3D location of the laser line pixels in the image 100 is determined. After the 3D location of the laser line pixels are determined, a 3D location of the trench 192 is determined. The 3D location of the trench 192 or trench parameters can include depth, width, and other geometric features, and geographical identification metadata of the trench 192 as well as the time of the captured image 100 are computed based on 3D measurement in the image 100. Additional images 100 may be captured until the image 100 includes the trench 192 with the commodity 102 therein. The 3D location of the trench 192 and the commodity 102 or commodity parameters can include depth of the commodity 102, distance from the commodity 102 to the boundary 200, and geographical identification metadata of the commodity 102 as well as the time of the captured image 100 with the commodity 102 are computed based on 3D measurement in the image 100.

Figure 9:
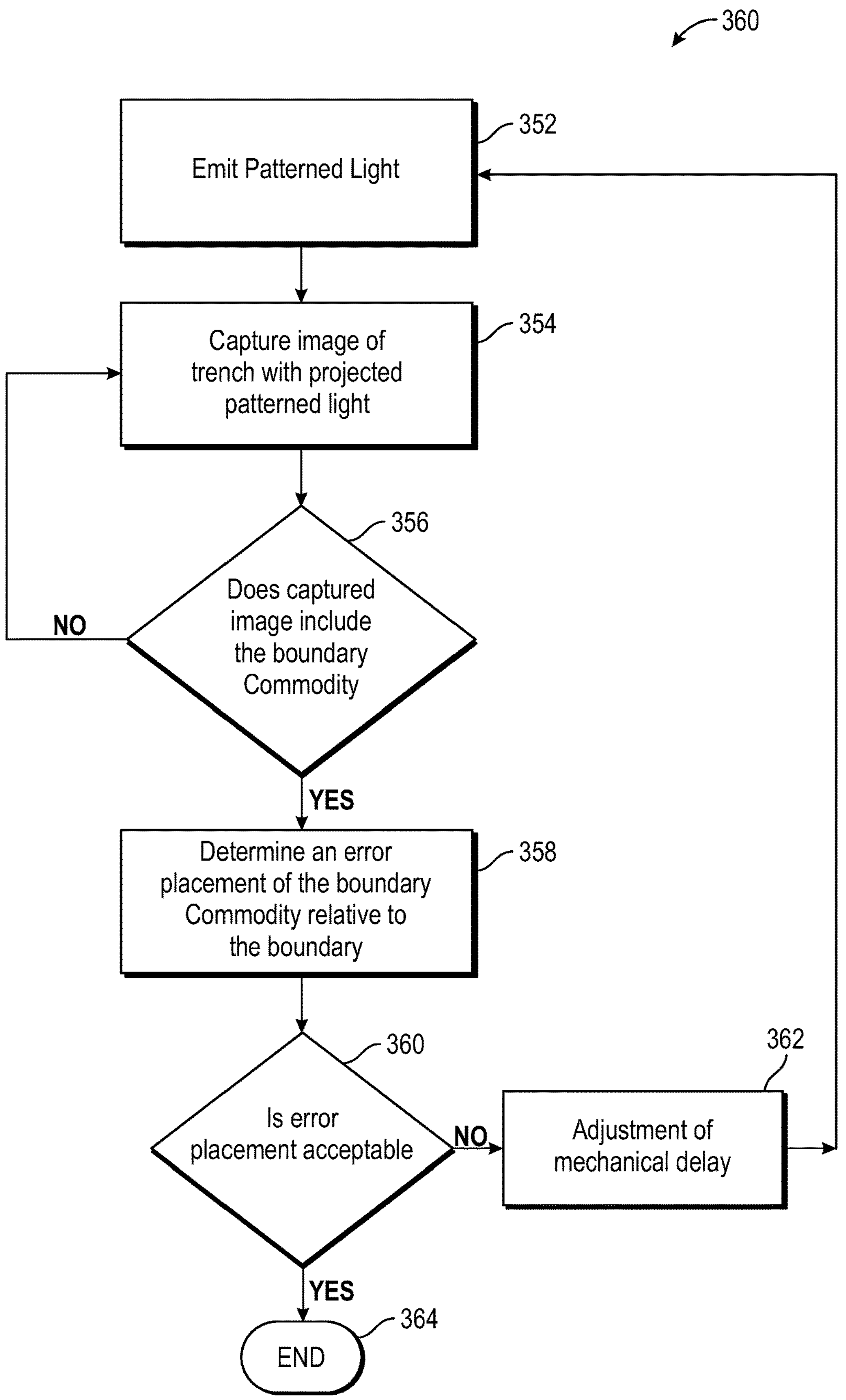
FIG. 9 is a procedure to determine an acceptable error placement of a commodity from the image of the FIG. 8 embodiment.

Certain systems are described and include examples of controller operations in various contexts of the present disclosure. In certain embodiments, such as procedure 350 shown in FIG. 9, the structured light unit 64 emits the patterned light toward the ground surface G at an operation 352 that includes the image 100 illustrated as a line is the intersection of the emitted patterned light or laser plane LP and the trench in the ground surface G. The camera or imaging unit 62 captures the emitted patterned light or the light plane LP from the structured light unit 64 such that the camera or imaging unit 62 captures the image 100 of the trench with the projected patterned light at an operation 354. As discussed previously, the emitted patterned light includes a single line, multiple lines, grids, stripes, one or more dots or point projections, cross, triangle, or other known pattern of light, which corresponds to the projected patterned light that is captured in the image 100 at operation 354. The controller 80 is operable to determine the location of the projected light in the image 100 (3D or three-dimensional space). At operation 356, the controller 80 is operable to determine whether the image 100 includes the boundary commodity 102. If the image 100 does not include the boundary commodity 102, then the camera or imaging unit 62 continues to capture the image 100 of the trench with the projected patterned light at the operation 354. Returning to step 356, if the image 100 includes the boundary commodity 102, then the procedure continues to step 358 wherein the controller 80 determines the error placement 210 or 212 of the boundary commodity 102 relative to the boundary 200 in the image 100. In step 358, the controller 80 can also detect the geolocation of the boundary commodity 102 from an image and extend pixel mapping to geograph location of the boundary commodity 102. In step 358, measurements and/or GPS locations of the boundary commodity 102 relative to the boundary 200 based on images captured by the visualization system 60 determine the error placement 210 or 212.

In step 360, the controller 80 determines if the error placement 210 or 212 is acceptable. If the error placement 210 or 212 is not acceptable, then at step 362 adjustment of a mechanical delay offset factor of the planter row unit 14 is determined. In step 362, adjustment of the mechanical delay offset factor of the planter components or mechanical delay offset factor of the planter section control in response to determined error placement 210 or 212 is not acceptable is made. The adjustments to the mechanical delay offset factor of the mechanical systems, the planter section control, and/or commodity delivery systems of the planter row unit 14 can be made by an operator or automatically such as by the controller 80.

Step 362 then continues to step 352 to repeat the procedure 350 and continue checking for the boundary commodity 102 in relation to the boundary 200 and an acceptable error placement 210 or 212. The procedure 350 is applicable to commodity that can include seed, sprays, residue, fertilizer, growing plants, and/or emergence detection of a plant.

In step 360, if the error placement 210 or 212 is acceptable, then at step 364 the procedure 350 ends.

Turning now to the embodiment illustrated in FIGS. 10-20 that includes the visualization system 60 that identifies a specific location of the commodity 102 such as a seed that is placed in the ground G in a captured image. The visualization system 60 also identifies a specific location of a product 304 such as fertilizer or weed control product that is placed in the ground G in a captured image. In some situations the material or product 304 is not actually applied at a desired location that coincides with the specific location of the commodity 102, and instead the product 304 is applied elsewhere that is not on or under the specific location of the commodity 102. The present application provides systems and methods for automatically adjusting planter components or mechanical delay offset factor of the seed placement, fertilizer, and herbicide systems in response to any of determined seeding or commodity measurements, determined fertilizer measurements, determined weed measurements, and/or determined herbicide measurements based on images captured by the visualization system 60. The determined seeding or commodity measurements in the captured images can be relative to any of the determined weed, fertilizer, or herbicide measurements in the captured images. The determined weed measurements in the captured images can be relative to any of the determined seed, fertilizer, or herbicide measurements in the captured images. The determined fertilizer measurements in the captured images can be relative to any of the determined seed, weed, or herbicide measurements in the captured images. The determined herbicide measurements in the captured images can be relative to any of the determined seed, weed, or fertilizer measurements in the captured images.

The controller 80 determines, based on the captured images of the product 304, a product characterization that includes details of the product 304 that was placed in the ground G based on the captured image. Some details of the product characterization of the product 304 include a length, a width, an area, a depth of the product in the ground G, but other details could be determined. The controller 80 determines an error characterization 306 of the product characterization relative to placement of the commodity 102 in the captured image. The controller 80 determines the error characterization 306 or error placement between the target commodity 102 and the product characterization of the product 304 applied near, on, or under the target commodity 102 in the capture images. For example, the target commodity 102 can include a seed, weed plant, or a fertilizer. The product 304 can include anything that is not the target commodity 102. For example, if the target commodity 102 is a seed then the product 304 can be a fertilizer that is applied near, on, or under the target commodity 102 that is the seed. The target commodity 102 can include a weed and the product 304 can be a herbicide.

The controller 80 determines whether the error characterization 306 is within an acceptable range. If the error characterization 306 is not within the acceptable range, then adjustments to the mechanical delay offset factor of the mechanical systems, the planter section control, seed delivery system, seed metering system, commodity delivery system, and/or product delivery system of the planter row unit 14 can be made by an operator or automatically such as by the controller 80. The systems and methods adjust the mechanical delay offset factor of the mechanical systems of the planter row unit 106 accordingly until the error characterization 306 is within an acceptable range or value. The adjustments to the mechanical delay offset factor of the mechanical systems of the planter row unit 106 can be made by an operator or automatically such as by the controller 80 or the material application control system 113. The present description proceeds with respect to the examples being deployed on a row unit of a planter. They could just as easily be deployed on a sprayer, an air seeder, a tillage machine with a side-dress bar, or other piece of agricultural equipment that is used to apply a commodity or product.

Figure 10:
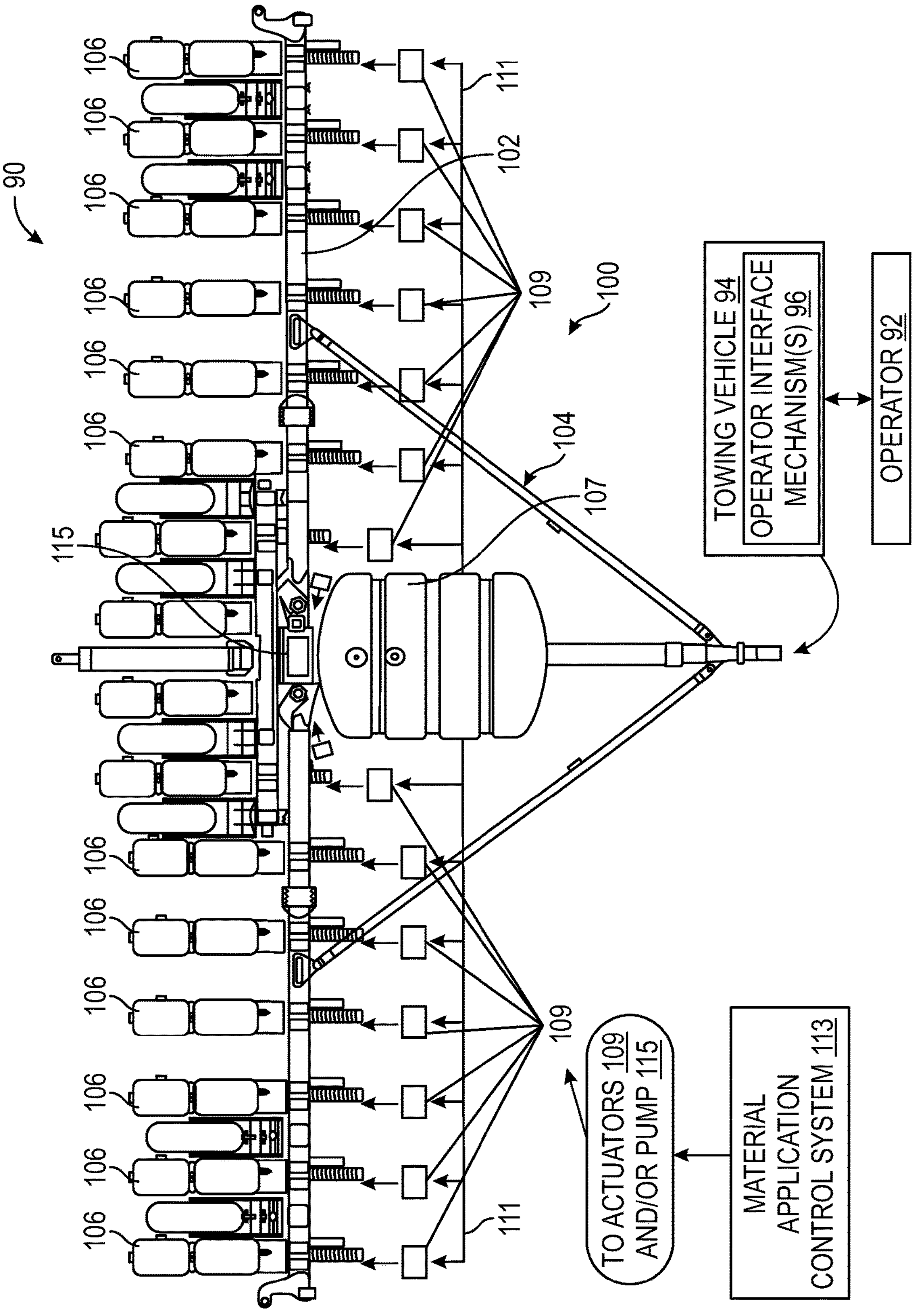
FIG. 10 is a top view of one example of a planting machine, shown in a partial pictorial and partial schematic form.

Turning now to FIG. 10 is a partial pictorial, partial schematic top view of one example of an architecture 90 that includes agricultural planting machine 100, towing vehicle 94, that is operated by operator 92, and material application control system 113, which can be on one or more individual parts of machine 100, centrally located on machine 100, or on towing vehicle 94. Operator 92 can illustratively interact with operator interface mechanisms 96 to manipulate and control vehicle 94, system 113, and some or all portions of machine 100.

Machine 100 is a row crop planting machine that illustratively includes a toolbar 102 that is part of a frame 104. FIG. 10 also shows that a plurality of planting row units 106 are mounted to the toolbar 102. Machine 100 can be towed behind towing vehicle 94, such as a tractor. FIG. 10 shows that material can be stored in a tank 107 and pumped through a supply line 111 so the material can be dispensed in or near the rows being planted. In one example, a set of devices (e.g., actuators) 109 is provided to perform this operation. For instance, actuators 109 can be individual pumps that service individual row units 106 and that pump material from tank 107 through supply line 111 so it can be dispensed on the field. In such an example, material application control system 113 controls the pumps 115. In another example, actuators 109 are valves and one or more pumps 115 pump the material from tank 107 to valves 109 through supply line 111. In such an example, material application control system 113 controls valves 109 by generating valve or actuator control signals, e.g., on a per-seed basis, as described below. The control signal for each valve or actuator can, in one example, be a pulse width modulated control signal. The flow rate through the corresponding valve 109 can be based on the duty cycle of the control signal (which controls the amount of time the valve is open and closed). It can be based on multiple duty cycles of multiple valves or based on other criteria. Further, the material can be applied in varying rates on a per-seed or per-plant basis. For example, fertilizer may be applied at one rate when it is being applied at a location spaced from a seed location and at a second, higher, rate when it is being applied closer to the seed location. These are examples only.

Figure 11:
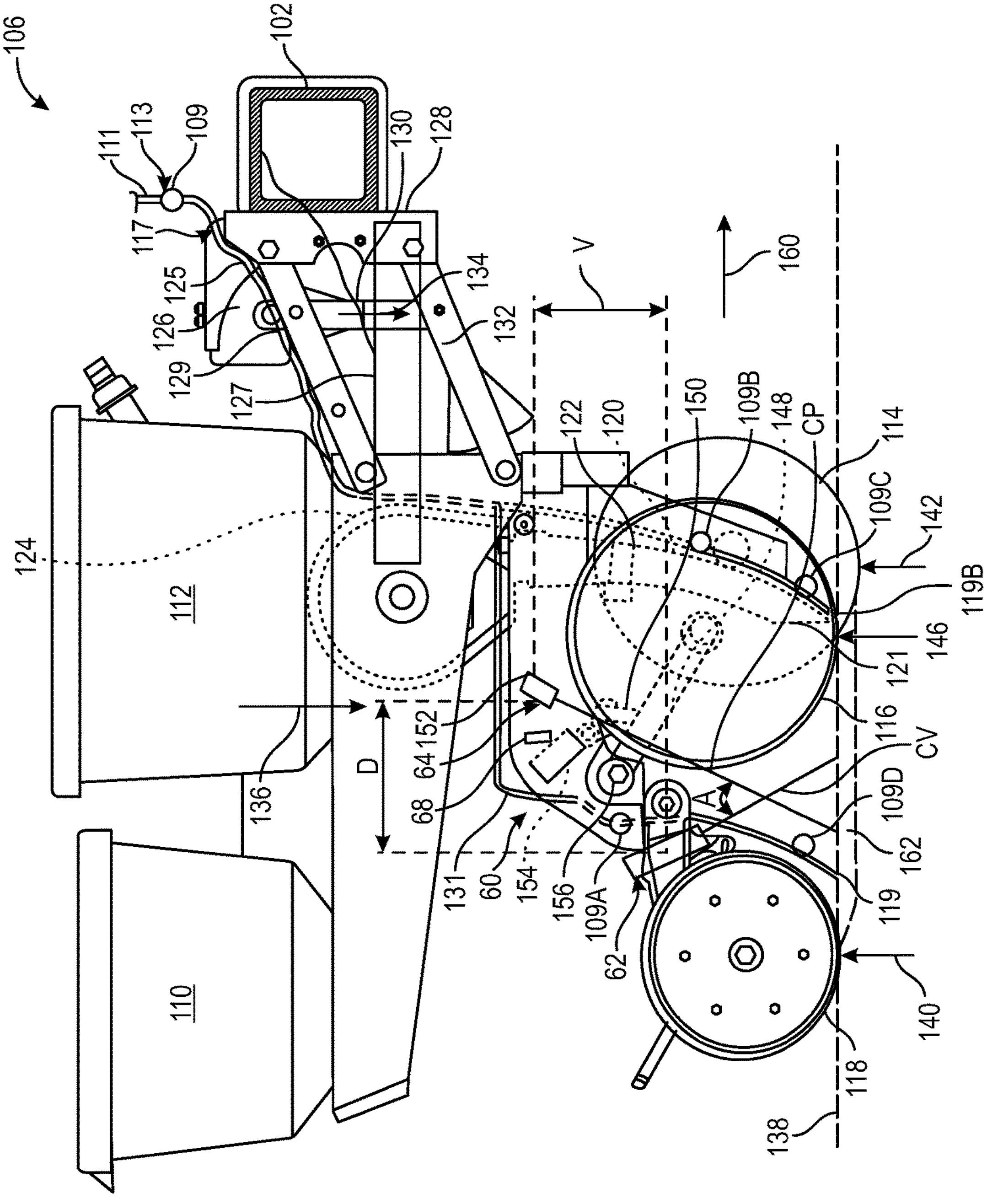
FIG. 11 is a side view showing one example of a row unit of the planting machine illustrated in FIG. 10.

FIG. 11 is a side view of one example of a row unit 106, with actuator 109 and system 113 shown as well. Actuator 109 is shown in five possible locations labeled as 109, 109A, 109B, 109C and 109D. Row unit 106 illustratively includes a chemical tank 110 and a seed storage tank 112. It also illustratively includes one or more disc openers 114, a set of gauge wheels 116, and a set of closing wheels 118. Seeds from tank 112 are fed into a seed meter 124, e.g., by gravity or from a centralized commodity distribution system (e.g., exploiting pneumatic commodity distribution to each row unit). The seed meter 124 controls the rate at which seeds are dropped into a seed tube 120 or other seed delivery system, such as a brush belt or flighted belt (shown in FIGS. 16-17, respectively), from seed storage tank 112. The seeds can be sensed by a seed sensor 122.

In the example shown in FIG. 11, liquid material or product is passed, e.g., pumped or otherwise forced, through supply line 111 to an inlet end of actuator 109. Actuator 109 is controlled by control system 113 to allow the liquid or product to pass from the inlet end of actuator 109 to an outlet end.

As liquid passes through actuator 109, it travels through an application assembly 117 from a proximal end (which is attached to an outlet end of actuator 109) to a distal tip (or application tip) 119, where the liquid is discharged into a trench, or proximate a trench or furrow 162, opened by disc opener 114 (as is described in more detail below).

Some parts of row unit 106 will now be discussed in more detail. First, it will be noted that there are different types of seed meters 124, and the one that is shown is shown for the sake of example only and is described in greater detail below. However, in one example, each row unit 106 need not have its own seed meter. Instead, metering or other singulation or seed dividing techniques can be performed at a central location, for groups of row units 106. The metering systems can include finger pick-up discs and/or vacuum meters (e.g., having rotatable discs, rotatable concave or bowl-shaped devices), among others. The seed delivery system can be a gravity drop system (such as seed tube 120 shown in FIG. 11) in which seeds are dropped through the seed tube 120 and fall (via gravitational force) through the seed tube and out the outlet end 121 into the seed trench 162. Other types of seed delivery systems may be or may include assistive systems, in that they do not simply rely on gravity to move the seed from the metering system into the ground. Instead, such assistive systems actively assist the seeds in moving from the meter to a lower opening, where they exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system. Some examples of assistive systems are described in greater detail below with respect to FIGS. 16 and 17.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 11, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor, which may be located anywhere on row unit 106 where it can sense that load. The gauge wheel load sensor can also be placed where it may not sense the load directly, but a characteristic indicative of that load. For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth.

Arms (or gauge wheel arms) 148 illustratively abut against a mechanical stop (or arm contact member-or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted.

In operation, row unit 106 travels generally in the direction indicated by arrow 160. The double disc opener 114 opens a furrow 162 in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the furrow 162, e.g., push soil back into the furrow 162.

As the seeds are dropped through seed tube 120, they can be sensed by seed sensor 122. Some examples of seed sensor 122 are described in greater detail below. Some examples of seed sensor 122 may include an optical or reflective sensor, which includes a radiation transmitter component and a receiver component. The transmitter component emits electromagnetic radiation and the receiver component then detects the radiation and generates a signal indicative of the presence or absence of a seed adjacent the sensors. In another example, row unit 106 may be provided with a seed firmer that is positioned to travel through the furrow 162, after seeds are placed in furrow 162, to firm the seeds in place. A seed sensor can be placed on the seed firmer and generate a sensor signal indicative of a seed. Again, some examples of seed sensors are described in greater detail below.

The present description proceeds with respect to the seed sensor being located to sense a seed passing it in seed tube 120, but this is for the sake of example only. Material application control system 113 illustratively receives a signal from seed sensor 122, indicating that a seed is passing sensor 122 in seed tube 120. It then determines when to actuate actuator 109 so that material or product being applied through application assembly 117 (and out distal tip 119 of application assembly 117) will be applied at a desired location relative to the seed in trench or furrow 162.

Material application control system 113 illustratively is programmed with, or detects a distance, e.g., a longitudinal distance, that the distal tip 119 is from the exit end 121 of seed tube 120. It also illustratively senses, or is provided by another component, such as the GPS device 180 or the agricultural work machine 140 such as a tractor, the ground speed of row unit 106. Once system 113 receives a seed sensor signal indicating that a seed is passing sensor 122 in seed tube 120, system 113 determines the amount of time it will take for the seed to drop through the outlet end of seed tube 121 and into furrow 162 to reside at its final seed location and position in furrow 162. It then determines when tip 119 will be in a desired location relative to that final seed location and it actuates valve 109 to apply the material or product at the desired location. By way of example, it may be that some material or product is to be applied directly on the seed. In that case, system 113 times the actuation of actuator 109 so that the applied material or product will be applied at the seed location. In another example, it may be desirable to apply some material or product at the seed location and also a predetermined distance on either side of the seed location. In that case, system 113 controls the signal used to control actuator 109 so that the material or product is applied in the desired fashion. In other examples, it may be that the material or product is to be applied at a location between seeds in furrow 162. By way of example, relatively high nitrogen fertilizer may be most desirably applied between seeds, instead of directly on the seed. In that case, system 113 has illustratively been programmed with the desired location of the applied material, relative to seed location, so that it can determine when to actuate actuator 109 in order to apply the material between seeds. Further, as discussed above, actuator 109 can be actuated to dispense material or product at a varying rate. It can dispense more material on the seed location and less at locations spaced from the seed location, or vice versa, or according to other patterns.

It will be noted that a wide variety of different configurations are contemplated herein. For instance, in one example, FIG. 11 shows that actuator 109 may be placed closer to the distal tip 119 (such as indicated by actuator 109A and 109C). In this way, there is less uncertainty as to how long it will take the material to travel from the actuator 109A and 109C to the distal tip 119. In yet another example, the valve is disposed at a different location (such as on seed tube 120) as indicated by actuator 109B and 109D. In those scenarios, again, actuator 109B and 109D are closer to the distal tip 119B and the material may be applied before and/or after the seed drops into furrow 162. For instance, when seed sensor 120 detects a seed, system 113 may be able to actuate valve 109B or 109D to apply material to furrow 162, before the seed exits the exit end 121 of seed tube 120. However, by the time the seed drops through distal end 121 of seed tube 120, the final seed location may be directly on the applied material. In yet another example, system 113 can control actuator 109B or 109D so that it applies material, but then stops applying it before the seed exits distal end 121. In that case, the material may be applied at a location behind the seed in furrow 162, relative to the direction indicated by arrow 160. This actuation timing enables the material to be applied between seeds, on seeds, or elsewhere. All of these and other configurations are contemplated herein.

Figure 12:
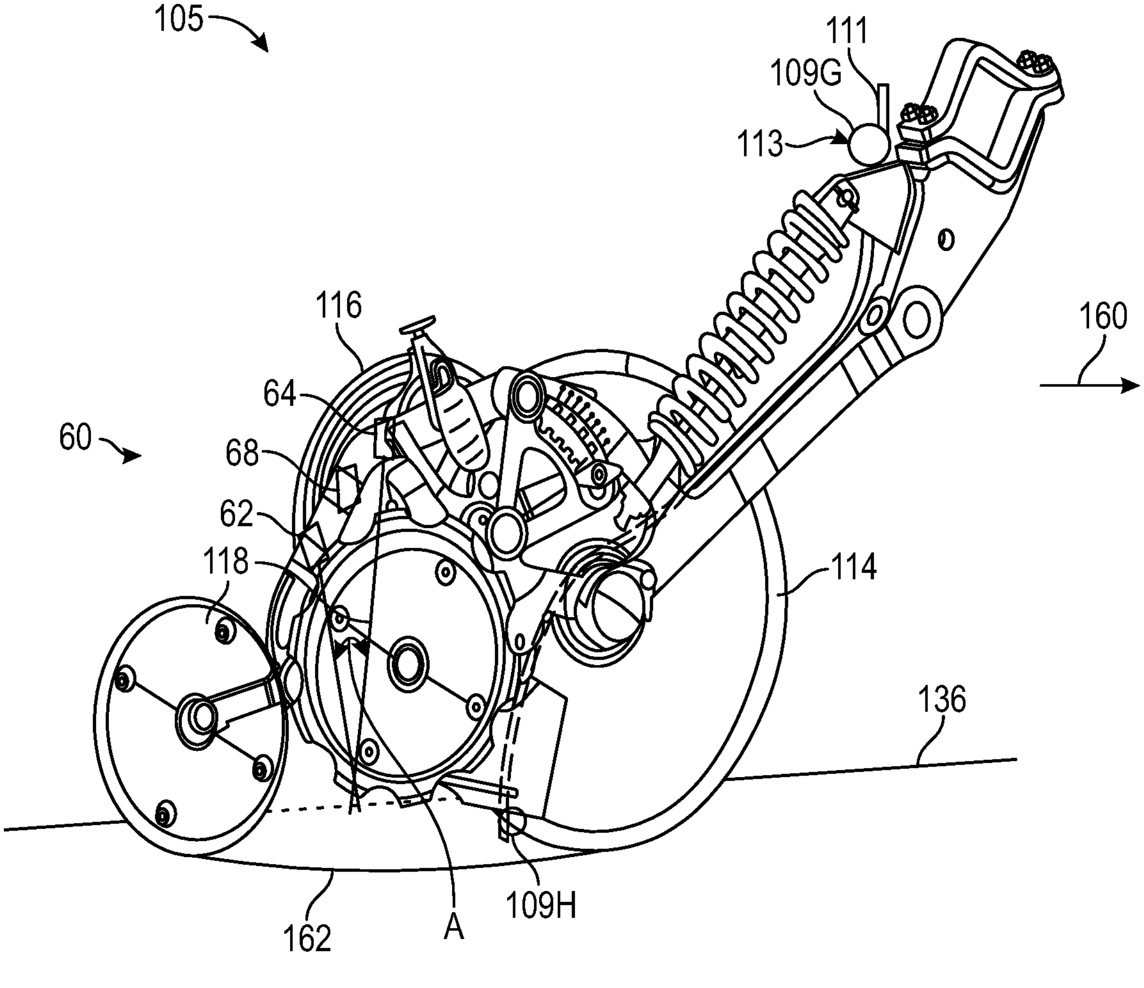
FIG. 12 is a view of an application unit.

FIG. 12 is a side perspective view of an applicator unit 105. Some items are similar to those shown in FIG. 11 and they are similarly numbered. Briefly, in operation, applicator unit 105 attaches to a side-dress bar that is towed behind a towing vehicle 94, so unit 105 travels between rows (if the rows are already planted). However, instead of planting seeds, it simply applies material or product 304 at a location between rows of seeds (or, if the seeds are not yet planted, between locations where the rows will be, after planting). When traveling in the direction indicated by arrow 160, disc opener 114 (in this example, it is a single disc opener) opens furrow 162 in the ground 136, at a depth set by gauge wheel 116. When actuator 109 is actuated, material or product 304 is applied in the furrow 162 and closing wheels 118 then close the furrow 162.

As unit 105 moves, material application control system 113 controls actuator 109 to dispense material or product 304. This can be done relative to seed or plant locations of the seeds or target commodity 102, if they are sensed or are already known or have been estimated. It can also be done before the seed or plant locations are known. In this latter scenario, the locations where the material or product 304 is applied can be stored so that seeds or target commodity 102 can be planted later, relative to the locations of the material or product 304 that has been already dispensed.

The visualization system 60 including the camera or imaging unit 62, the structured light unit 64, and in some embodiments the general illumination light 68 is mounted to the applicator unit 105. The visualization system 60 is configured to capture one or more images of the commodity 102 and the product 304 when these are deposited on the ground 138. In other embodiments, the visualization system 60 is mounted to the towing vehicle 94.

FIG. 12 shows that actuator 109 can be mounted to one of a plurality of different positions on unit 105. Two of the positions are shown at 109G and 109H. These are examples and the actuator 109 can be located elsewhere as well. Similarly, multiple actuators can be disposed on unit 105 to dispense multiple different materials or to dispense it in a more rapid or more voluminous way than is done with only one actuator 109.

Figure 13:
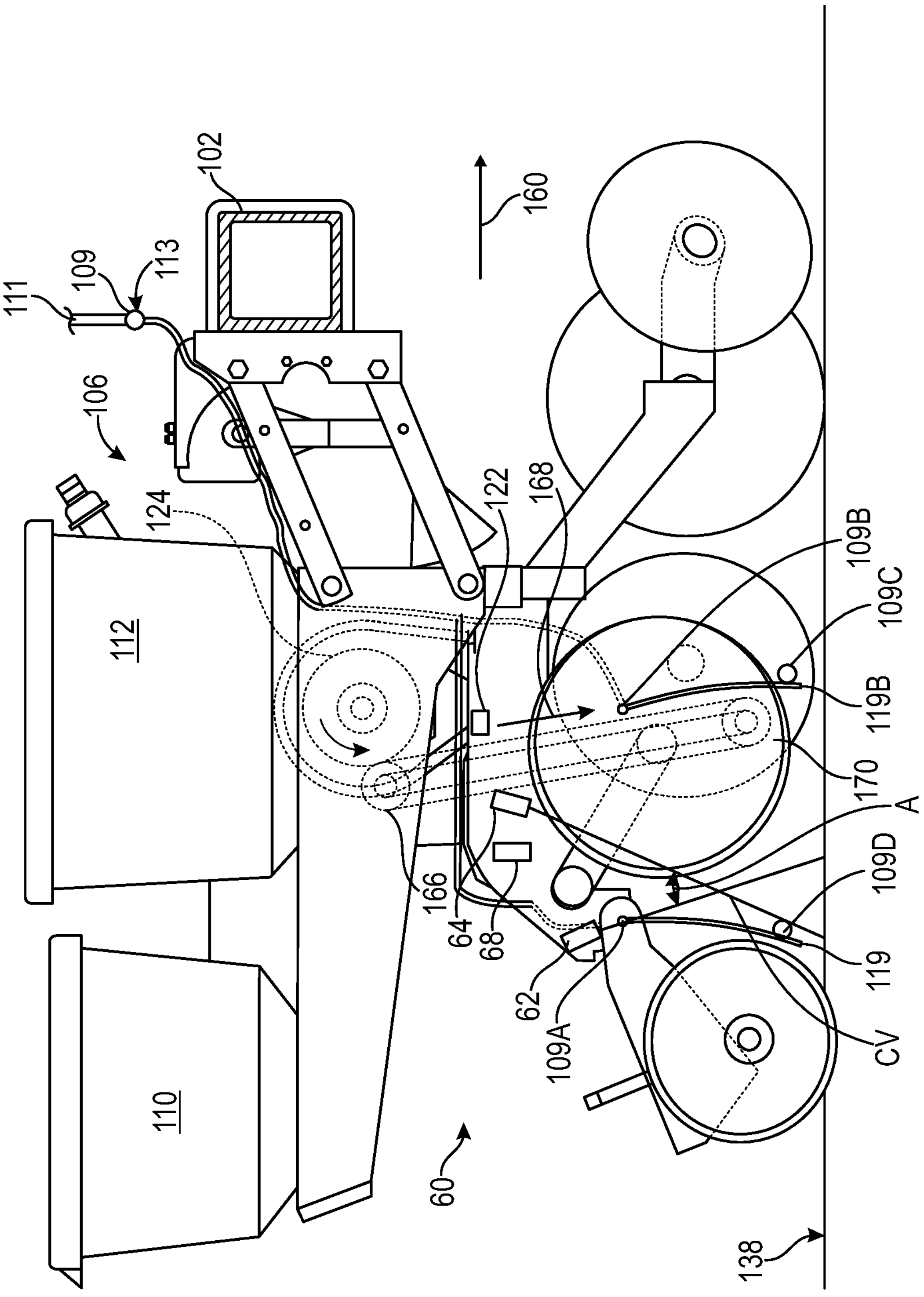
FIG. 13 is a side view showing another example of a row unit of the planting machine illustrated in FIG. 10.

FIG. 13 is similar to FIG. 11, and similar items are similarly numbered. However, instead of the seed delivery system being a seed tube 120, which relies on gravity to move the seed to the furrow 162, the seed delivery system shown in FIG. 13 is an assistive seed delivery system 166. Assistive seed delivery system 166 also illustratively has a seed sensor 122 disposed therein. Assistive seed delivery system 166 captures the seeds as they leave seed meter 124 and moves them in the direction indicated by arrow 168 toward furrow 162. System 166 has an outlet end 170 where the seeds exit assistive system 166, into furrow 162, where they again reach their final resting location.

In such a system, material application control system 113 considers the speed at which delivery system 166 moves the seed from seed sensor 122 to the exit end 170. It also illustratively considers the speed at which the seed moves from the exit end 170 into furrow 162. For instance, in one example the seed simply drops from exit end 170 into furrow 162 under the force of gravity. In another example, however, the seed can be ejected from delivery system 166 at a greater or lesser speed than that which would be reached under the force of gravity. Similarly, it may be that the seed drops straight downward into furrow 162 from the outlet end 170. In another example, however, it may be that the seed is propelled slightly rearwardly from the outlet end 170, to accommodate for the forward motion of the row unit 106, so that the travel path of the seed is more vertical and so the seed rolls less once it reaches the furrow. Further, the seed can be ejected rearwardly and trapped against the ground by a trailing member (such as a pinch wheel) which functions to stop any rearward movement of the seed, after ejection, and to force the seed into firm engagement with the ground. FIG. 13 also shows that valve 109 can be placed at any of a wide variety of different locations, some of which are illustrated by values 109A, 109B, 109C and 109D. There can be a more than one seed sensor, seed sensors of different types, different locations for seed sensors, etc.

The visualization system 60 including the camera or imaging unit 62, the structured light unit 64, and in some embodiments the general illumination light 68 is mounted to the row unit 106. The visualization system 60 is configured to capture one or more images of the commodity 102 and the product 304 when these are deposited on the ground 138.

Figure 14:
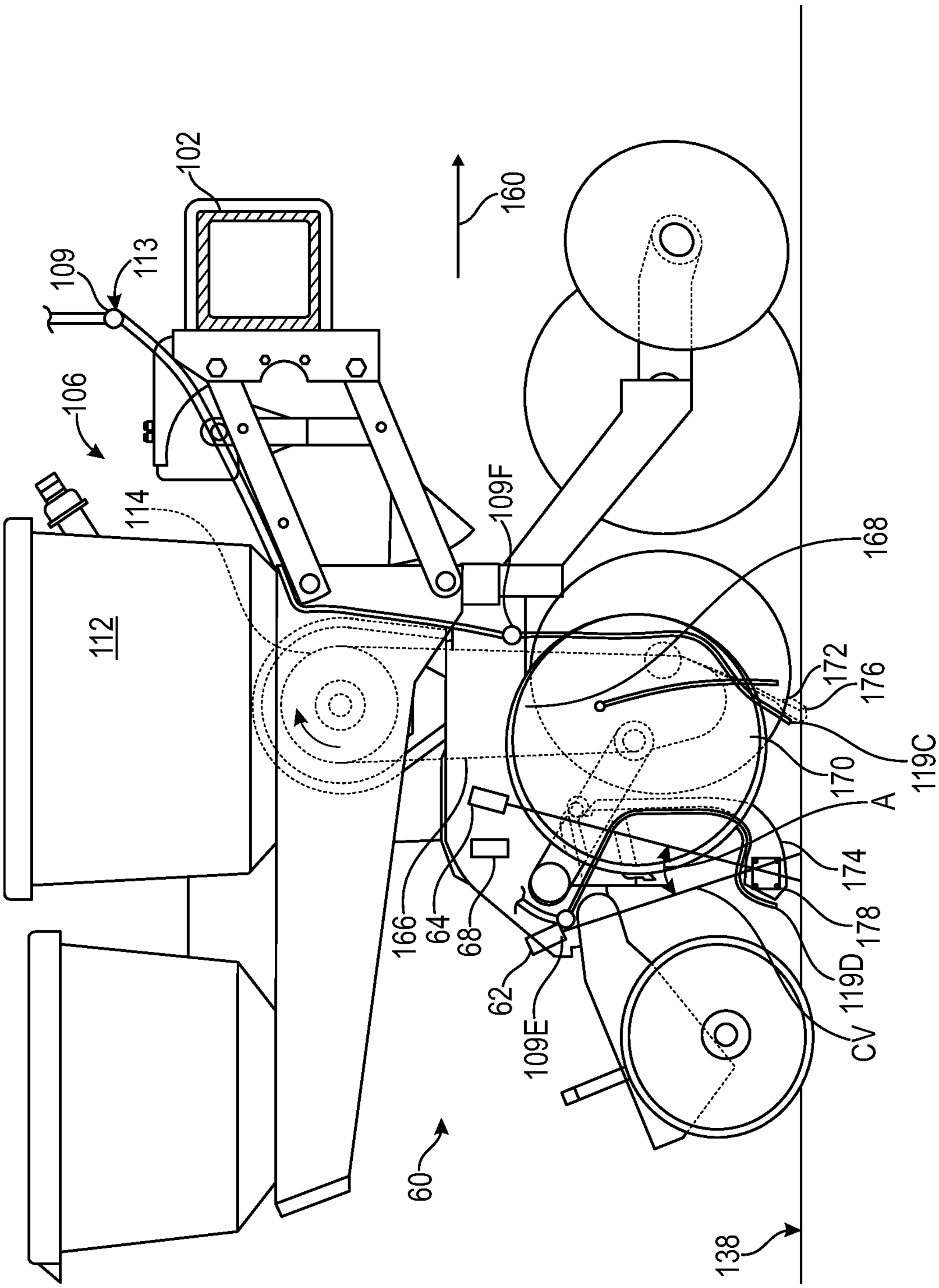
FIG. 14 is a side view showing another example of a row unit of the planting machine illustrated in FIG. 10.

FIG. 14 is similar to FIG. 13 and similar items are similarly numbered. However, in FIG. 14, row unit 106 is also provided with members 172 and/or 174. Members 172 and/or 174 can be spring biased into engagement with the soil, or rigidly attached to the frame of row unit 106. In one example, member 172 can be a furrow shaper, which contacts the soil in the area within or closely proximate the furrow, and immediately after the furrow is opened, but before the seed is placed therein. Member 172 can thus contact the side(s) of the furrow, the bottom of the furrow, an area adjacent the furrow, or other areas. It can be fitted with a sensor 176, e.g., seed sensor 176, as well.

In another example, member 172 can be positioned so that it moves through the furrow after the seed is placed in the furrow. In such an example, member 172 may act as a seed firmer, which firms the seed into its final seed location.

In either case, member 172 can include a seed sensor 176, which senses the presence of the seed. It may be an optical sensor, which optically senses the seed presence as member 172 moves adjacent to, ahead of, or over the seed. It may be a mechanical sensor that senses the seed presence, or it may be another type of sensor that senses the presence of the seed in the furrow. Sensor 176 illustratively provides a signal to material application control system 113 indicating the presence of the sensed seed.

In such an example, it may be that actuator 109 is placed at the location of actuator 109E, shown in FIG. 14, and the outlet end of the application assembly is shown at 119C. In the example shown in FIG. 14, outlet end 119C is shown closely behind member 172 relative to the direction indicated by arrow 160. It can be disposed on the opposite side of member 172 as well (such as forward of member 172 in the direction indicated by arrow 160). In such an example, the seed sensor senses the seed at a location that corresponds to its final seed location, or that is very closely proximate its final seed location. This may increase the accuracy with which seed sensor 176 senses the final seed location.

The visualization system 60 including the camera or imaging unit 62, the structured light unit 64, and in some embodiments the general illumination light 68 is mounted to the row unit 106. The visualization system 60 is configured to capture one or more images of the commodity 102 and the product 304 when these are deposited on the ground 138.

Also, in the example shown in FIG. 14, row unit 106 can have member 174 in addition to, or instead of, member 172. Member 174 can also be configured to engage the soil within, or closely proximate, the trench or furrow. It can have a seed sensor 178 that senses the presence of a seed (or a characteristic from which seed presence can be derived). It can be placed so that it closely follows the exit end 121 of the seed tube 120, or the exit end 170 of the assistive delivery system 166. Also, actuator 109 can be placed at the position illustrated at 109F.

Figure 15:
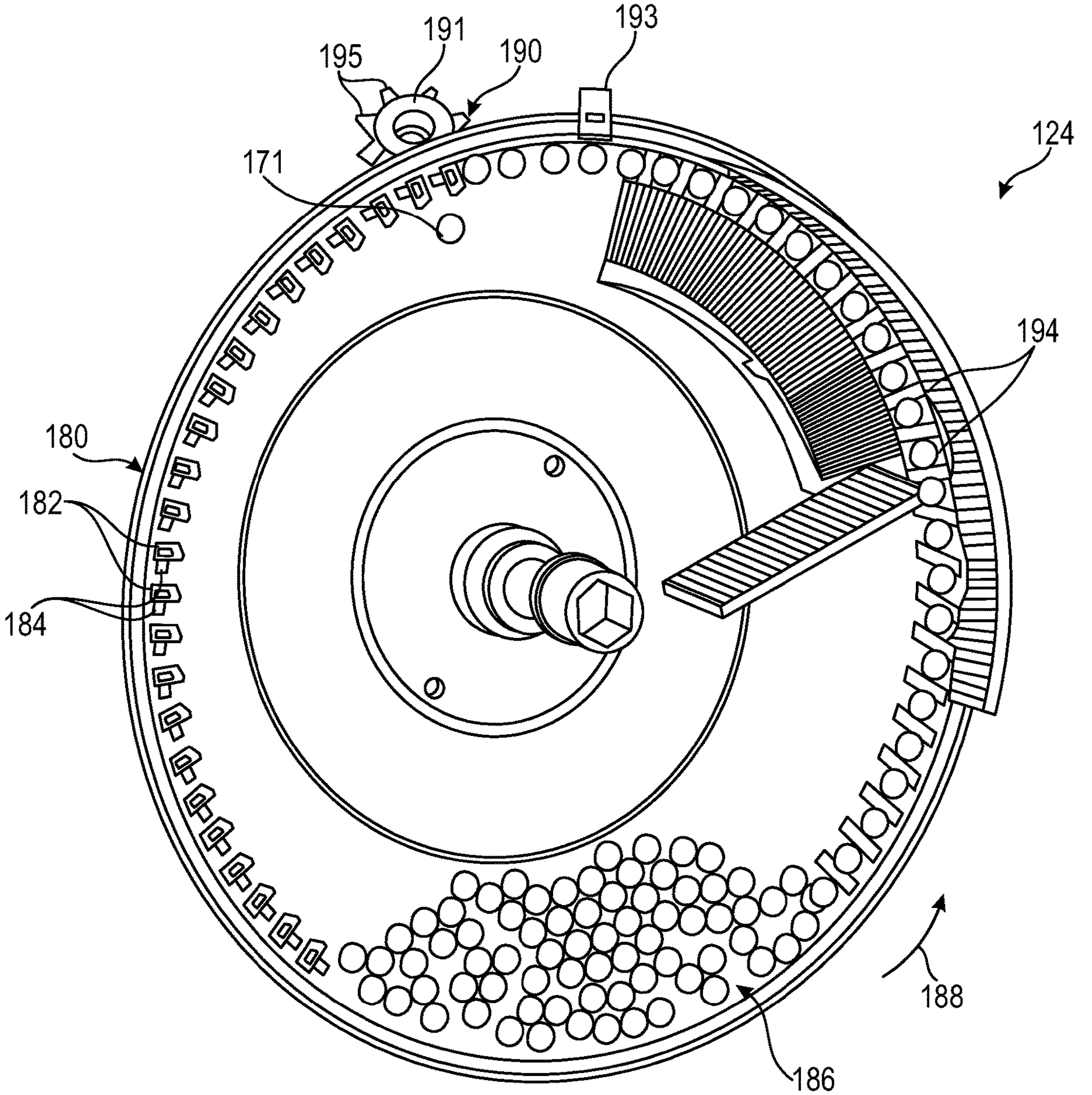
FIG. 15 is a perspective view of a portion of a seed metering system.

FIG. 15 shows one example of a rotatable mechanism that can be used as part of the seed metering system (or seed meter) 124. The rotatable mechanism includes a rotatable disc, or concave element, 180. Rotatable element 180 has a cover (not shown) and is rotatably mounted relative to the frame of the row unit 106. Rotatable element 180 is driven by a motor (not shown) and has a plurality of projections or tabs 182 that are closely proximate corresponding apertures 184. A seed pool 186 is disposed generally in a lower portion of an enclosure formed by rotating mechanism 180 and its corresponding cover. Rotatable element 180 is rotatably driven by its motor (such as an electric motor, a pneumatic motor, a hydraulic motor, etc.) for rotation generally in the direction indicated by arrow 188, about a hub. A pressure differential is introduced into the interior of the metering mechanism so that the pressure differential influences seeds from seed pool 186 to be drawn to apertures 184. For instance, a vacuum can be applied to draw the seeds from seed pool 186 so that they come to rest in apertures 184, where the vacuum holds them in place. Alternatively, a positive pressure can be introduced into the interior of the metering mechanism to create a pressure differential across apertures 184 to perform the same function.

Once a seed comes to rest in (or proximate) an aperture 184, the vacuum or positive pressure differential acts to hold the seed within the aperture 184 such that the seed is carried upwardly generally in the direction indicated by arrow 188, from seed pool 186, to a seed discharge area 190. It may happen that multiple seeds are residing in an individual seed cell. In that case, a set of brushes or other members 194 that are located closely adjacent the rotating seed cells tend to remove the multiple seeds so that only a single seed is carried by each individual cell. Additionally, a seed sensor 193 can also illustratively be mounted adjacent to rotating element 180. It generates a signal indicative of seed presence and this may be used by system 113, as will be discussed in greater detail below.

Once the seeds reach the seed discharge area 190, the vacuum or other pressure differential is illustratively removed, and a positive seed removal wheel or knock-out wheel 191, can act to remove the seed from the seed cell. Wheel 191 illustratively has a set of projections 195 that protrude at least partially into apertures 184 to actively dislodge the seed from those apertures. When the seed is dislodged (such as seed 171), it is illustratively moved by the seed tube 120, seed delivery system 166 (some examples of which are shown above in FIGS. 11-14 and below in FIGS. 16 and 17) to the furrow 162 in the ground.

After the seed is moved to the furrow 162 in the ground, the visualization system 60 captures one or more images of the seed or commodity 102 in the ground 138.

Figure 16:
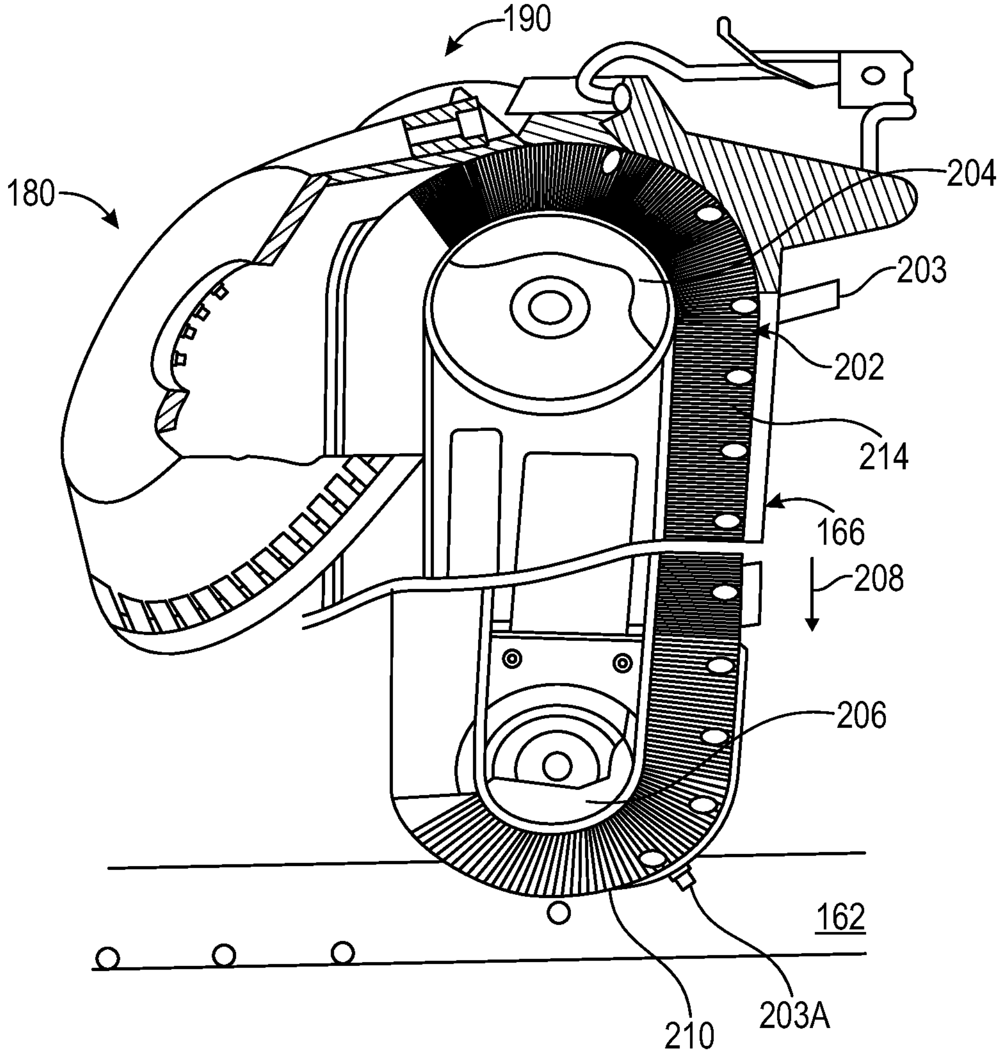
FIG. 16 shows an example of a seed delivery system that can be used with a seed metering system.

FIG. 16 shows an example of a seed metering system and a seed delivery system, in which the rotating element 180 is positioned so that its seed discharge area 190 is above, and closely proximate, seed delivery system 166. In the example shown in FIG. 16, seed delivery system 166 includes a transport mechanism such as a belt 200 with a brush that is formed of distally extending bristles 202 attached to belt 200 that act as a receiver for the seeds. Belt 200 is mounted about pulleys 204 and 206. One of pulleys 204 and 206 is illustratively a drive pulley while the other is illustratively an idler pulley. The drive pulley is illustratively rotatably driven by a conveyance motor, which can be an electric motor, a pneumatic motor, a hydraulic motor, etc. Belt 200 is driven generally in the direction indicated by arrow 208

Therefore, when seeds are moved by rotating element 180 to the seed discharge area 190, where they are discharged from the seed cells in rotating element 180, they are illustratively positioned within the bristles 202 by the projections 182 that push the seed into the bristles 202. Seed delivery system 166 illustratively includes walls that form an enclosure around the bristles 202, so that, as the bristles 202 move in the direction indicated by arrow 208, the seeds are carried along with them from the seed discharge area 190 of the metering mechanism, to a discharge area 210 either at ground level, or below ground level within a trench or furrow 162 that is generated by the furrow opener 114 on the row unit 106.

Additionally, a seed sensor 203 is also illustratively coupled to seed delivery system 166. As the seeds are moved within bristles 202, sensor 203 can detect the presence or absence of a seed. It should also be noted that while the present description will proceed as having sensors 122, 193 and/or 203, it is expressly contemplated that, in another example, only one sensor is used. Or additional sensors can also be used. Similarly, the seed sensor 203 shown in FIG. 16 can be disposed at a different location, such as that shown at 203A. Having the seed sensor closer to where the seed is ejected from the system can reduce error in identifying the final seed location. Again, there can be multiple seed sensors, different kinds of seed sensors, and they can be located at many different locations.

In some embodiments, the seed sensor may signal to the visualization system 60 to capture an image of the seed or target commodity 102 in the furrow 162. After the seed is moved to the furrow 162 in the ground, the visualization system 60 captures one or more images of the seed or commodity 102 in the ground 138.

Figure 17:
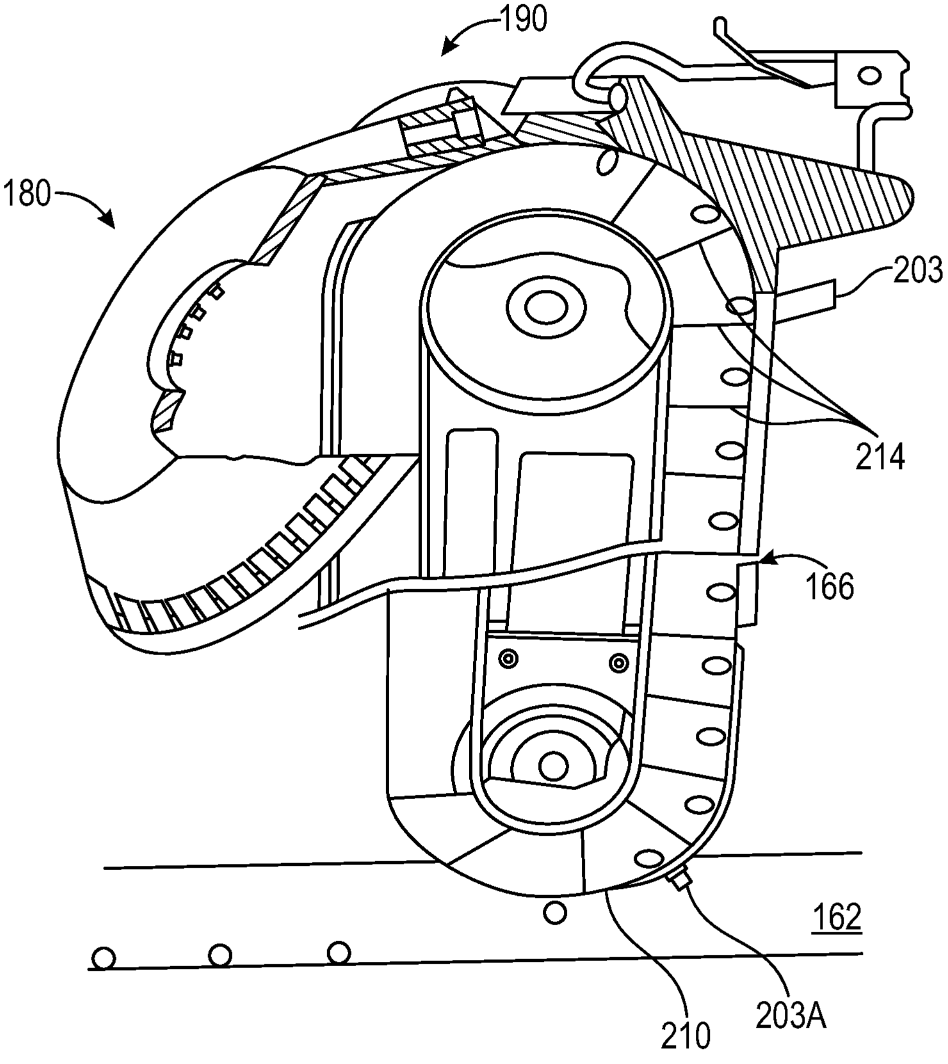
FIG. 17 shows another example of a delivery system that can be used with a seed metering system.

FIG. 17 is similar to FIG. 16, except that seed delivery system 166 does not include a belt with distally extending bristles. Instead, it includes a flighted belt (transport mechanism) in which a set of paddles 214 form individual chambers (or receivers), into which the seeds are dropped, from the seed discharge area 190 of the metering mechanism. The flighted belt moves the seeds from the seed discharge area 190 to the exit end 210 of the flighted belt, within the trench or furrow 162. In some embodiments, after the seed or target commodity 102 is moved to the furrow 162 in the ground, the visualization system 60 captures one or more images of the seed or target commodity 102 in the ground 138.

There are a wide variety of other types of delivery systems as well, that include a transport mechanism and a receiver that receives a seed. For instance, they include dual belt delivery systems in which opposing belts receive, hold, and move seeds to the furrow, a rotatable wheel that has sprockets, which catch seeds from the metering system and move them to the furrow, multiple transport wheels that operate to transport the seed to the furrow, and an auger, among others. The present description will proceed with respect to an endless member (such as a brush belt, a flighted belt) and/or a seed tube, but many other delivery systems are contemplated herein as well.

Before continuing with the description of applying material or product 304 relative to seed or target commodity 102 location, a brief description of some examples of seed sensors 122, 193 and 203 will first be provided. Sensors 122, 193 and 203 are illustratively coupled to seed metering system 124 and seed delivery system 120, 166. Sensors 122, 193 and 203 sense an operating characteristic of seed metering system 124 and seed delivery systems 120, 166. In one example, sensors 122, 193 and 203 are seed sensors that are each mounted at a sensor location to sense a seed within seed tube 120, seed metering system 124, and delivery system 166, respectively, as the seed passes the respective sensor location. In one example, sensors 122, 193, and 203 are optical or reflective sensors and thus include a transmitter component and a receiver component. The transmitter component emits electromagnetic radiation into seed tube 120, seed metering system 180, and/or delivery system 166. In the case of a reflective sensor, the receiver component then detects the reflected radiation and generates a signal indicative of the presence or absence of a seed adjacent to sensor 122, 193, and 203 based on the reflected radiation. With other sensors, radiation such as light, is transmitted through the seed tube 120, seed metering system 124, or the delivery system 166. When the light beam is interrupted by a seed, the sensor signal varies, to indicate a seed. Thus, each sensor 122, 193, and 203 generates a seed sensor signal that pulses or otherwise varies, and the pulses or variations are indicative of the presence of a seed passing the sensor location proximate the sensor.

For example, in regards to sensor 203, bristles 202 pass sensor 203 and are colored to absorb a majority of the radiation emitted from the transmitter. As a result, absent a seed, reflected radiation received by the receiver is relatively low. Alternatively, when a seed passes the sensor location where sensor 203 is mounted, more of the emitted light is reflected off the seed and back to the receiver, indicating the presence of a seed. The differences in the reflected radiation allow for a determination to be made as to whether a seed is, in fact, present. Additionally, in other examples, sensors 122, 193, and 203 can include a camera and image processing logic such as the visualization system 60 that allow visual detection as to whether a seed is present within seed metering system 124, seed tube 120, and/or seed delivery system 166, at the sensor location proximate the sensor. They can include a wide variety of other sensors (such as RADAR or LIDAR sensors) as well.

For instance, where a seed sensor is placed on a seed firmer, it may be mechanical or other type of sensor that senses contact with the seed as the sensor passes over the seed. Also, while the speed of the seed in the delivery system (or as it is ejected) can be identified by using a sensor that detects the speed of the delivery system, in some examples, the speed and/or other characteristics of movement of the seed can be identified using seed sensors. For instance, one or more seed sensors can be located to sense the speed of movement of the seed, its trajectory or path, its instantaneous acceleration, its presence, etc. This can be helpful in scenarios in which the seed delivery system changes speed.

The visualization system 60 previously described is operably connected and mounted to the row unit 106 as illustrated in FIGS. 11, 12, 13, and 14. The visualization system 60 includes the camera or imaging unit 62, the structured light unit 64, and in some embodiments the general illumination light 68 mounted to the planter row unit 106. Although one camera or imaging unit 62 is illustrated, additional cameras 62 can be used with the structured light unit 64. The camera or imaging unit 62 is mounted between the pair of closing wheels 118 and the pair of furrow opening disks 114 or the set of gauge wheels 116 or alternatively the camera or imaging unit 62 is mounted between the pair of closing wheels 118 and the seed delivery system 124. The structured light unit 64 is also mounted between the pair of closing wheels 118 and the pair of furrow opening disks 114 or alternatively the structured light unit 64 is mounted between the pair of closing wheels 118 and the seed delivery system 124. In the illustrated embodiment, the camera or imaging unit 62 is positioned close to the pair of closing wheels 118 and the structured light unit 64 is positioned close to the seed delivery system 124 and/or the pair of furrow opening disks 114. In other embodiments, the structured light unit 64 is positioned close to the pair of closing wheels 118 and the camera or imaging unit 62 is positioned close to the seed delivery system 124 and the pair of furrow opening disks 114.

Imaging by the camera or imaging unit 62 and operation of the general illumination light 68 and the structured light unit 64 is described previously. The general illumination light 68 can be placed anywhere on the row unit 106 to illuminate a field of view of the camera or imaging unit 62. Operation of the structured light unit 64, the general illumination light 68, and the camera or imaging unit 62 is previously described.

In certain embodiments, the visualization system 60 includes or is operatively connected to the controller 80 or a material application control system 113 structured to perform certain operations to control the camera or imaging unit 62, the structured light unit 64, and the general illumination light 68. The material application control system 113 can be placed anywhere on the row unit 106, the planter, the towing vehicle 94, or any work machine that may be connected to or capable of performing one or more planting operations. In certain embodiments, the camera or imaging unit 62 includes the controller 80 or the material application control system 113. The controller 80 is in communication with any sensor or other apparatus throughout the visualization system 60 and the row unit 106, including through direct communication, communication over a datalink, and/or through communication with other controllers or portions of the processing subsystem that provide sensor and/or other information to the controller 80.

Figure 18:
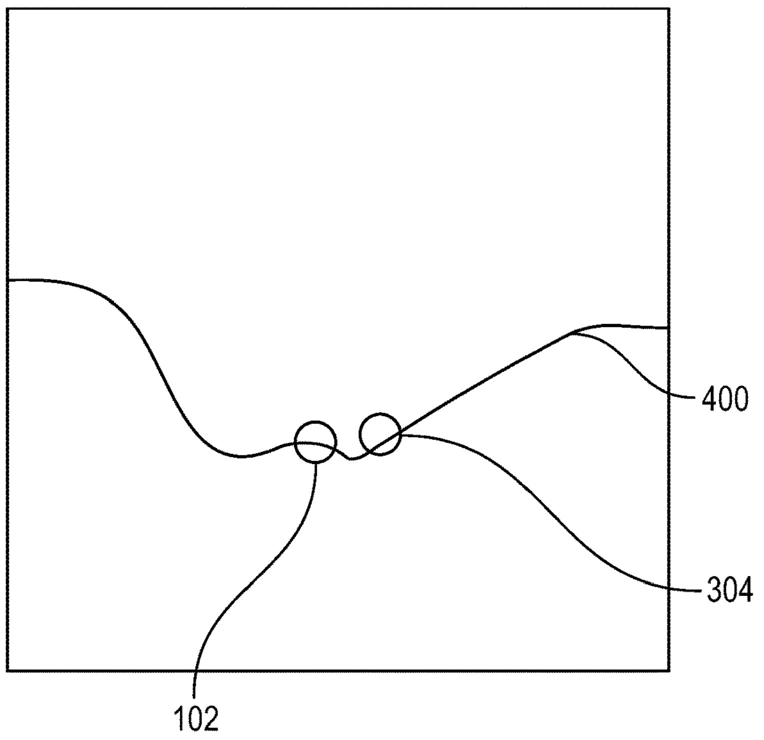
FIG. 18 is an image that is projected by a structured light unit of the visualization system of FIG. 10.
Figure 19:
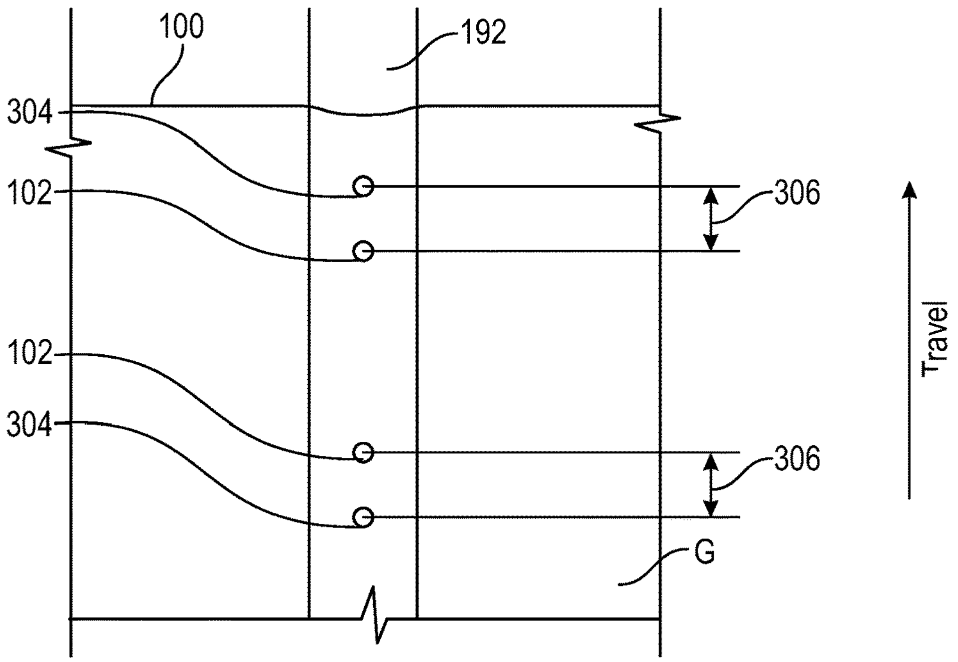
FIG. 19 is a third embodiment of a camera field of view of a furrow by the visualization system of FIG. 10.
Figure 20:
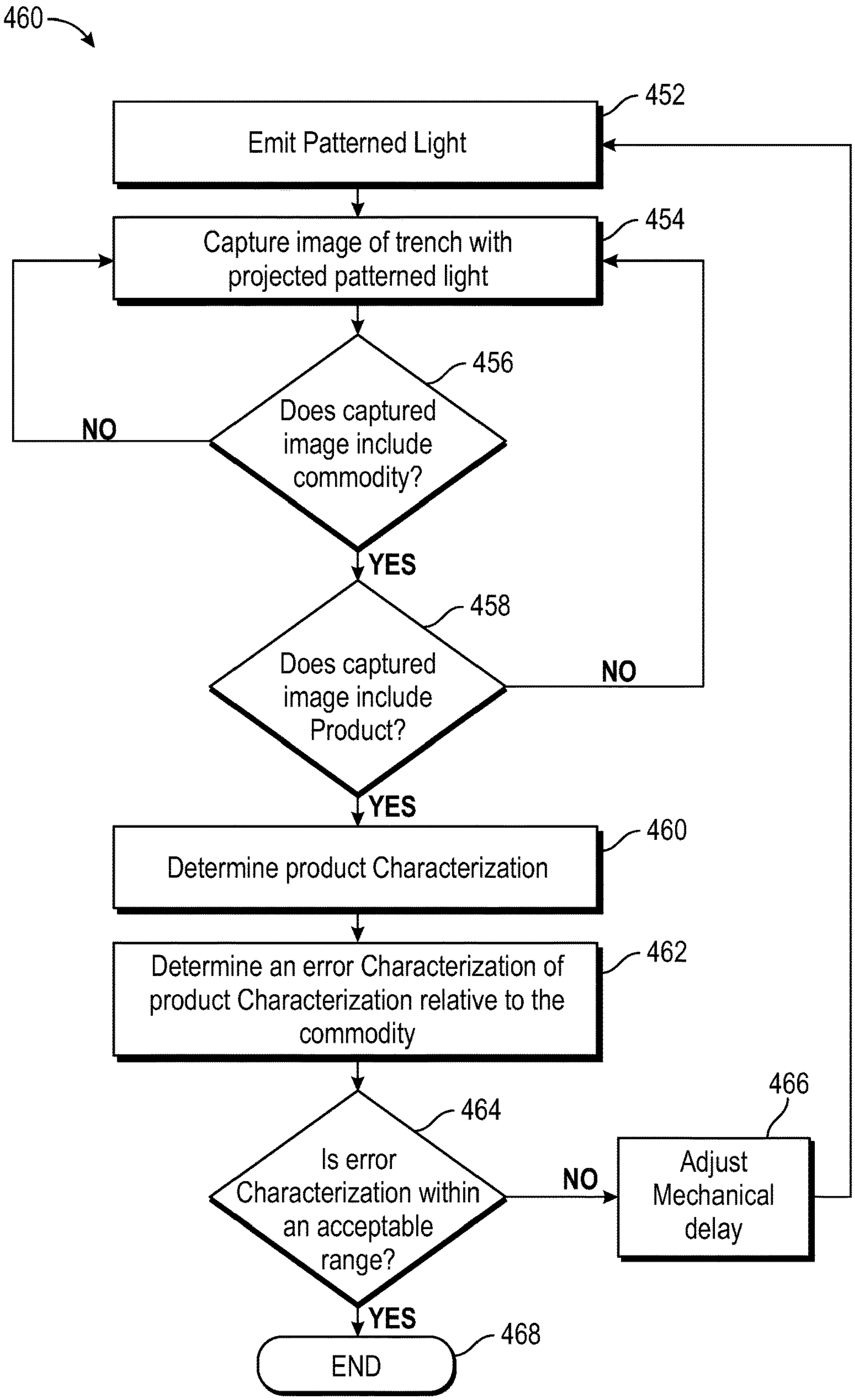
FIG. 20 is a procedure to determine an acceptable error characterization of a product relative to a commodity from the image of the FIG. 18 embodiment.

Measurement of the location of the commodity 102 in an image 400 is illustrated in FIGS. 18 and 19 and is similar to the measurement described by measuring the three-dimensional (3D) location of the laser points or patterned light of the image 100 that is projected by the structured light unit 64 as illustrated in FIG. 8. Similarly, the location of the product 304 in the image 400 is illustrated in FIGS. 18 and 19 and is similar to the measurement described by measuring the three-dimensional (3D) location of the laser points or patterned light of the image 100 that is projected by the structured light unit 64 as illustrated in FIG. 8.

In one form, the measurement of the locations of the commodity 102 and the product 304 are determined by using structured-light based sensing. In the embodiment wherein the structured light unit 64 projects a single line laser, the structured light unit 64 emits patterned light (see FIGS. 11-14) toward the ground surface G, and the image 400 illustrated as a line (see FIG. 18) is the intersection of the laser plane LP and the location of the commodity 102 and/or the product 304 in the ground surface G. The image 400 is a single line in FIG. 18, but more complicated patterns such as multiple lines, grids, or dots, or any type of patterned light previously discussed could be used in order to have more or less 3D points. The camera or imaging unit 62 captures the image 400 of the trench 192 with the commodity 102 therein with the projected patterned light.

Additionally, the camera or imaging unit 62 captures an image of the trench 192 with the product 304 therein with the projected patterned light. In some embodiments, the image 400 includes the commodity 102 and the product 304. In other embodiments, a first image includes the commodity 102 and a second image includes the product 304 such that the commodity 102 and the product 304 are not shown in a single image. The geometric relationship between the laser or light plane LP projected by the structured light unit 64 and the principle optical axis CV of the camera or imaging unit 62 is determined by the location and orientation of the camera or imaging unit 62 and the structured light unit 64 relative to each other, therefore the 3D location of the laser line pixels in the image 400 is determined. After the 3D location of the laser line pixels are determined, 3D locations of the commodity 102 and the product 304 are determined. The 3D locations of the commodity 102 and the product 304 are computed based on 3D measurement in the image 400.

Certain systems are described and include examples of controller operations in various contexts of the present disclosure. In certain embodiments, such as procedure 460 shown in FIG. 20, the structured light unit 64 emits the patterned light toward the ground surface G at an operation 452 that includes the image 400 illustrated as a line is the intersection of the emitted patterned light or laser plane LP and the trench in the ground surface G. The camera or imaging unit 62 captures the emitted patterned light or the light plane LP from the structured light unit 64 such that the camera or imaging unit 62 captures the image 400 of the trench with the projected patterned light at an operation 454. As discussed previously, the emitted patterned light includes a single line, multiple lines, grids, stripes, one or more dots or point projections, cross, triangle, or other known pattern of light, which corresponds to the projected patterned light that is captured in the image 400 at operation 454. The controller 80 is operable to determine the location of the projected light in the image 400 (3D or three-dimensional space).

As the commodity 102 is placed in the furrow 162 in the ground 138, the commodity 102 is captured in images by the visualization system 60 assembled with the row unit 106. As the product 304 is discharged from the distal tip 119 into the furrow 162 in the ground 138, the product 304 is captured in images by the visualization system 60 assembled with the row unit 106. In some embodiments, the commodity 102 is placed in the furrow 162 before the product 304 is placed in the furrow 162. In other embodiments, the product 304 is placed in the furrow 162 before the commodity 102 is placed. The commodity 102 can include a seed, weed plant, or a fertilizer. The product 304 can include anything that is not the commodity 102. For example, if the commodity 102 is a seed then the product 304 can be a fertilizer that is applied near the commodity 102 that is the seed. As another example, the commodity 102 can include a weed and the product 304 can be a herbicide.

In some images the commodity 102 and the product 304 are captured in the same image. In other embodiments, the commodity 102 is captured in a first image and the product 304 is captured in a second image, or vice versa.

At operation 456, the controller 80 is operable to determine whether the image 400 includes the commodity 102. If the image 400 does not include the commodity 102, then the camera or imaging unit 62 continues to capture the image 400 of the trench with the projected patterned light at the operation 454 until the captured image includes the commodity 102.

At step 456, if the image 400 includes the commodity 102, then the procedure continues to step 358 wherein the controller 80 is operable to determine whether the image 400 includes the product 304. If the image 400 does not include the product 304, then the camera or imaging unit 62 continues to capture the image 400 of the trench with the projected patterned light at the operation 454 until the captured image includes the product 304.

At step 458, if the image 400 includes the product 304, then the procedure continues to step 360 wherein the controller 80 is operable to determine, based on the captured images 400 of the product 304, a product characterization that includes details of the product 304 being a fertilizer, liquid, granular, herbicide, herbicide product, or other product that was placed in the ground G as determined from the captured image 400. Some details of the product characterization of the product 304 include the type of product such as fertilizer or herbicide, a length, a width, an area, a depth of the product 304 in the ground G, 3D location of the product 304, and other details about the product 304 can be determined. Other details of the product characterization of the product 304 include if the product 304 is liquid material and is being applied in a band of liquid, it may indicate the length of each application band applied on the ground G. Similarly, the application rate may vary within an application band. For instance, the product 304 may be applied more heavily near the center of the band than at either end of the band or vice versa.

The procedure then continues to step 462 wherein the controller 80 determines an error characterization 306 of the product characterization determined in step 458 relative to placement and location of the commodity 102 in the captured image from step 456. The controller 80 determines the error characterization 306 or error placement between the commodity 102 and the product characterization of the product 304 applied near the commodity 102 in the images 400. The error characterization 306 or error placement between the commodity 102 and the product characterization of the product 304 may indicate a placement of a band or product 304 relative to the seed location of the commodity 102. For instance, where the band or product 304 is four inches long, the product characterization determined in step 458 may indicate a placement of the center of the band (along its longitudinal length). The error characterization 306 or error placement may indicate relative placement of the product characterization of the product 304 to commodity location of the commodity 102. In this way, where the product 304 is to be applied at the commodity location of the commodity 102, then the center of the band will illustratively correspond to the commodity location. However, where the product 304 is to be applied at a location other than the commodity location of the commodity 102, then the center of the band will illustratively be offset from the commodity location by a desired amount.

The procedure then continues to step 464 wherein the controller 80 determines whether the error characterization 306 or error placement is within an acceptable range. If the error characterization 306 or error placement is not within the acceptable range, then the procedure continues to step 466 wherein adjustments to the mechanical delay offset factor of any of the mechanical systems, the planter section control, commodity delivery system 166, seed metering system 124, actuator 109, application assembly 117, applicator unit 105, and/or product delivery systems of the planter row unit 14 or 106 can be made by an operator or automatically such as by the controller 80. These systems and methods can then adjust the mechanical delay offset factor of the mechanical systems of the planter row unit 106 accordingly until the error characterization 306 or error placement is within an acceptable range or value. In one example, the unacceptable range of the error characterization is greater than 5 inches. In other embodiments, the unacceptable range of the error characterization could be greater than 2, 3, or 4 inches. In one example, the error characterization is in the acceptable range that is between 0 and 5 inches. In other embodiments, the error characterization is in the acceptable range that is between 0 and 8 inches. In other embodiments, the operator can designate the unacceptable and acceptable ranges of the error characterization.

The adjustments to the mechanical delay offset factor of the mechanical systems of the planter row unit 106 can be made by an operator or automatically such as by the controller 80 or the material application control system 113. The present description proceeds with respect to the visualization system 60 deployed on a row unit of a planter. The visualization system 60 could be deployed on a sprayer, an air seeder, a tillage machine with a side-dress bar, or other piece of agricultural equipment that is used to apply the commodity 102 or the product 304. The present description could also be deployed on autonomy cameras on tractors and sprayers such that the visualization system 60 could be used to define stop/start times or section control. For example, the sprayer camera can see and identify the grass in a waterway in the capture image and thus shut off. An alternative view was using the cameras to determine on/off system delays by seeing the spray via viable or thermal views. Alternatively, this concept could also be utilized to see fertilizer from an air boom or dry box spread and provide the appropriate system on/off time settings.

If the error characterization 306 or error placement is within the acceptable range, then the procedure continues to step 468 and no adjustments to the mechanical delay offset factor of any of the mechanical systems, the planter section control, commodity delivery system 166, seed metering system 124, actuator 109, application assembly 117, applicator unit 105, and/or product delivery systems of the planter row unit 14 or 106 are made and the procedure ends.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The invention claimed is:

1. A method comprising:

emitting a patterned light from a visualization system mounted on a planter row unit onto a trench in a ground surface, wherein the visualization system includes a structured light unit mounted on the planter row unit;

depositing a commodity in the trench by the planter row unit;

capturing, with the visualization system that includes a camera mounted on the planter row unit, a two-dimensional image of the projected patterned light on the trench including the commodity;

determining, with a controller operably connected to the camera, whether the captured commodity is a boundary commodity relative to a field boundary distinct from the trench geometry;

determining, with the controller, an image-derived boundary placement error of the boundary commodity in the two-dimensional image relative to the field boundary; and in response to the boundary placement error, determining a mechanical delay offset factor of a planter section control associated with the planter row unit to adjust a turn-on or turn-off timing of the planter section at the field boundary.

2. The method of claim 1, further comprising:

determining, with the controller, a location of the commodity in the trench in the two-dimensional image.

3. The method of claim 1, further comprising:

determining, with the controller, whether the commodity captured in the two-dimensional image is the boundary commodity is one of a first-placed commodity after a section turn-on or a last-placed commodity before a section turn-off at the field boundary.

4. The method of claim 1, wherein the adjusting the mechanical delay offset factor of the planter section control is performed automatically by the controller.

5. The method of claim 1, wherein the error placement is an underlap condition of the commodity relative to the boundary wherein the underlap condition includes the boundary commodity placed upstream of the field boundary relative to a direction of travel of the planter row unit.

6. The method of claim 1, wherein the error placement is an overlap condition of the commodity relative to the boundary wherein the overlap condition includes the boundary commodity placed downstream of the field boundary relative to a direction of travel of the planter row unit.

7. The method of claim 1, wherein the planter row unit is coupled to an agricultural work machine, the planter section control includes a commodity delivery system coupled to the controller and the agricultural work machine.

8. The method of claim 1, further comprising:

determining a desired error of placement that includes a desired distance for depositing the boundary commodity relative to the boundary;

determining whether the error placement of the boundary commodity in the two-dimensional image relative to the boundary is greater than the desired error of placement; and in response to the error placement being greater than the desired error of placement, adjusting a mechanical delay offset factor of a planter section control coupled with the planter row unit.

9. The method of claim 8, wherein in response to the error placement being less than the desired error of placement, alerting an operator of this condition.

10. The method of claim 8, further comprising:

in response to the commodity being the boundary commodity, determining with the controller, a geographical identification metadata of each of the boundary commodity in the trench in the two-dimensional image and the boundary.

11. The method of claim 8, wherein the planter section control is operably coupled to one or more of a hopper, a seed meter, and a seed delivery system, or other systems coupled with the planter row unit that are included in the mechanical delay offset factor.

12. A method comprising:

emitting a patterned light from a visualization system mounted on a planter row unit onto a trench in a ground surface, wherein the visualization system includes a structured light unit mounted on the planter row unit;

depositing a commodity in the trench by the planter row unit;

capturing, with the visualization system that includes a camera mounted on the planter row unit, a two-dimensional image of the projected patterned light on the trench that includes the commodity;

depositing a product in the trench by the planter row unit;

determining, with a controller operably connected to the camera, a location of the commodity in the two-dimensional image; and determining, with a controller operably connected to the camera, whether the captured commodity is a boundary commodity relative to a boundary as measured relative to a direction of travel of the planter row unit, wherein the boundary is distinct from the trench geometry;

determining, with the controller, an image-derived boundary placement error of the boundary commodity in the two-dimensional image relative to the boundary; and in response to the boundary placement error, determining a mechanical delay offset factor of a planter section control associated with the planter row unit to adjust a turn-on or turn-off timing of the planter section at the boundary.

13. The method of claim 12, further comprising:

capturing, with the visualization system that includes a camera mounted on the planter row unit, a two-dimensional image of the projected patterned light on the trench that includes the product;

determining, with the controller, a product characterization of the product in the two-dimensional image;

wherein the commodity and the product are captured in the same two-dimensional image.

14. The method of claim 13, wherein the commodity is captured in one of the two-dimensional image and the product is captured in a second of the two-dimensional image.

15. The method of claim 13, wherein the product is any of a fertilizer, a liquid material, a granular material, or a herbicide material.

16. The method of claim 13, further comprising:

determining, with the controller, an error characterization of the product characterization relative to the location of the commodity in the two-dimensional image; and determining, with the controller, whether the error characterization is within an acceptable range or an unacceptable range.

17. The method of claim 16, wherein the product characterization includes any of a length, a width, an area, or a depth of the product as determined from the two-dimensional image.

18. The method of claim 16, further comprising:

in response to the error characterization being in the unacceptable range, adjusting a mechanical delay offset factor of any of a planter section control, a commodity delivery system, or a product delivery system coupled with the planter row unit and the controller.

19. The method of claim 13, wherein the product characterization is a band of fertilizer having a length, wherein the commodity is a seed, wherein the error characterization indicates a placement of the band of product in the two-dimensional image relative to a location of the commodity in the two-dimensional image.

* * * * *